United States Patent
Aliyu et al.

(10) Patent No.: US 12,406,045 B1
(45) Date of Patent: *Sep. 2, 2025

(54) COMPUTER READABLE STORAGE MEDIUM WITH PROGRAM INSTRUCTIONS FOR BIOMETRIC AUTHENTICATION

(71) Applicant: KING FAHD UNIVERSITY OF PETROLEUM AND MINERALS, Dhahran (SA)

(72) Inventors: Farouq Muhammad Aliyu, Dhahran (SA); Falmata Modu, Dhahran (SA); Anas Al-Roubaiey, Dhahran (SA); Audu Musa Mabu, Dhahran (SA)

(73) Assignee: KING FAHD UNIVERSITY OF PETROLEUM AND MINERALS, Dhahran (SA)

(*) Notice: Subject to any disclaimer, the term of this patent is extended or adjusted under 35 U.S.C. 154(b) by 0 days.

This patent is subject to a terminal disclaimer.

(21) Appl. No.: 19/209,386

(22) Filed: May 15, 2025

Related U.S. Application Data

(63) Continuation of application No. 18/313,807, filed on May 8, 2023, now Pat. No. 12,314,366.

(51) Int. Cl.
G06F 21/32 (2013.01)

(52) U.S. Cl.
CPC ................... G06F 21/32 (2013.01)

(58) Field of Classification Search
CPC ....................................... G06F 21/32
See application file for complete search history.

(56) References Cited

U.S. PATENT DOCUMENTS

| | | | |
|---|---|---|---|
| 8,621,209 B1 | 12/2013 | Johansson et al. | |
| 10,079,024 B1* | 9/2018 | Bhimanaik | G10L 17/02 |
| 10,432,605 B1* | 10/2019 | Lester | H04L 63/08 |
| 2016/0219046 A1 | 7/2016 | Ballard et al. | |
| 2019/0220583 A1* | 7/2019 | Douglas | G06V 40/70 |

FOREIGN PATENT DOCUMENTS

WO  2018/007823 A1  1/2018

* cited by examiner

*Primary Examiner* — Nicholas R Taylor
*Assistant Examiner* — Tania M Pena-Santana
(74) *Attorney, Agent, or Firm* — Oblon, McClelland, Maier & Neustadt, L.L.P.

(57) ABSTRACT

A computer system and method having an energy-efficient multi-biometric authentication that includes a fingerprint scanner, a camera, a memory, and a processing circuitry. The processing circuitry reads a predefined probability from the memory and generates a random number. The processing circuitry inputs a user ID and retrieves a trust value for the user from a trust database. The processing circuitry obtains a scanned user fingerprint using a fingerprint scanner and obtains a captured user face using the camera. The processing circuitry applies a reward to the trust value to increase the trust value when the scanned user fingerprint is substantially the same as the stored user fingerprint and the captured user face is substantially the same as a stored user face in a face database, store the trust value as the cumulative trust value for the user, and authenticate the user to allow access to the computer system.

5 Claims, 20 Drawing Sheets

COMPUTER READABLE STORAGE MEDIUM WITH PROGRAM INSTRUCTIONS FOR BIOMETRIC AUTHENTICATION

CROSS-REFERENCE TO RELATED APPLICATIONS

The present application is a Continuation of U.S. application Ser. No. 18/313,807, now allowed, having a filing date of May 8, 2023.

STATEMENT REGARDING PRIOR DISCLOSURE BY THE INVENTORS

Aspects of this technology are described in an article Modu, F., et al.: Energy-efficient multi-biometric system for Internet of Things using trust management. IET Biom. 10 (6), 625-639 (2021). The article was published online Mar. 30, 2021, and is herein incorporated by reference in its entirety.

BACKGROUND

Technical Field

The present disclosure is directed to an energy-efficient multi-biometric system for Internet of Things (IoT).

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

A biometric authentication system authenticates a user by receiving, analyzing, and comparing a biometric trait of the user with a stored biometric data of the user. Based on the authentication, the biometric authentication system allows the authorized user to access premises of an organization, building, secure system, etc. A unibiometric biometric system uses a single biometric identifier, and a unimodal biometric system uses a single representation of a trait for recognition. A multi-biometric biometric system uses multiple independent or weakly correlated biometric identifiers. The unimodal system has been known to have a lot of problems, like intra-class variation, matching problems, spoof attacks, etc. As a solution to aforementioned problems, an Raspberry Pi (RPi)-based multi-biometric authentication system was introduced which uses both fingerprint and face recognition. However, using both fingerprint and face recognition increases the memory requirement, computational complexity, and latency of the authentication system. To overcome such problems faced by RPi and such authentication systems, data was transferred to a cloud server for processing and storage. The authentication systems capture biometrics (i.e., facial and fingerprint images), encrypt them using Advanced Encryption Standard (AES)-256, and send them to the cloud, where authentication is performed. The result of the authentication process is then sent to the authentication systems, which is used for access control. Although the systems save costs by transferring computation and storage to the cloud, the cost of transmitting the information to the cloud remains problematic.

Due to the emergence of Internet of Things (IoT) services in smart cities, industries, smart homes, personal assistants, etc., security measures are needed at various stages. As the number of characteristics used in the IoT-based biometric system increase, the computation and communication resources used by the system also increase. IoT-based biometric systems face various issues such as limited processing power, limited energy, limited memory, and the transmission of data. IoT-based biometric systems rely on a cloud server for complex computation and storage. In a conventional fingerprint-based authentication system, a single-board computer (SBC) is used. The SBC is a computer about a size of a credit card that contains a processor, main memory, secondary memory, network card, and other auxiliary resources. The conventional authentication system uses a client-server paradigm, where SBC RPi is used as a server, and a plurality of smartphones or workstations can be used as clients. The server is connected to a fingerprint scanner. The SBC RPi system compares scanned fingerprints with enrolled fingerprints to identify a user. The SBC RPi system has a true positive and a true negative, implying that there is at least a chance that the user will try the system more than once before he/she is identified by the system, thereby enhancing the energy consumption and acting as a restraint for battery-powered embedded system.

Another conventional face recognition security system uses Eigenface for feature extraction and Principal Component Analysis (PCA) as a classifier. To reduce energy consumption, an ultrasonic sensor is used to detect the presence of a user. When the user is detected, a camera is enabled, and the user's image is captured. A feature extraction routine associated with the face recognition security system collects the data from the captured image and forwards the face segment of the image to the face recognition algorithm. A face recognition algorithm associated with the face recognition security system compares the faces segment information with the previously collected data and produces an output indicating whether the user is recognized or not. This face recognition security system is efficient, but is limited by the Raspberry Pi's processing capability.

In some security systems, a single sensor (camera) is used to capture both the iris and cornea of the user. Using the single sensor avoids having many sensors and energy overhead. However, the single sensor (camera) consumes more energy than most biometric systems. Also, the image processing adds complexity, and increases the energy consumption and the latency of the system.

Hence, there is a need for an energy-efficient multi-biometric authentication that employs a trust management system along with a decision-level multi-biometric system for improving accuracy and lowering energy consumption.

SUMMARY

In an exemplary embodiment, a method for multi-biometric authentication in a computer system is described. The method includes reading, via processing circuitry, a predefined probability. The method includes generating, via the processing circuitry, a random number between 0 and 1. When the probability is less than the random number, the method includes inputting, via the processing circuitry, a user ID and retrieving a trust value for the user from a trust database. When the trust value is greater than a trust threshold, then the method includes obtaining a scanned user fingerprint using a scanner. When the scanned user fingerprint is substantially the same as a stored user fingerprint in a fingerprint database, the method includes applying a reward to the trust value to increase the trust value, storing the trust value as a cumulative trust value for the user, and authenticating the user to allow access to the computer system. Otherwise, the method includes applying a punishment to the trust value to decrease the trust value, and storing the trust value as the cumulative trust value for the user. When the trust value is less than the trust threshold, then the method includes obtaining a scanned user fingerprint using a scanner and obtaining a captured user face using a camera. When the scanned user fingerprint is substantially the same as the stored user fingerprint and the captured user face is substantially the same as a stored user face in a face database, the method includes applying a reward to the trust value to increase the trust value, storing the trust value as the cumulative trust value for the user, and allowing access to the computer system. Otherwise, the method includes applying a punishment to the trust value to decrease the trust value, and storing the trust value as the cumulative trust value for the user. When the probability is greater than or equal to the random number, the method includes reading face biometrics of the user using the camera, reading fingerprint biometrics of the user using the fingerprint scanner, and inputting the user ID. When the scanned user fingerprint is substantially the same as the stored user fingerprint and the read user face is substantially the same as a stored user face in a face database, the method includes applying a reward to the trust value to increase the trust value, storing the trust value as the cumulative trust value for the user, and authenticating the user to allow access to the computer system. Otherwise, the method includes applying a punishment to the trust value to reduce the trust value, and storing the trust value as the cumulative trust value for the user.

In another exemplary embodiment, a computer system having an energy-efficient multi-biometric authentication is described. The system includes a fingerprint scanner, a camera, a memory, and a processing circuitry. The processing circuitry is configured to read from the memory a predefined probability, generate a random number between 0 and 1, input a user ID and retrieve a trust value for the user from a trust database maintained in the memory when the probability is less than the random number, obtain a scanned user fingerprint using the fingerprint scanner when the trust value is greater than a trust threshold, apply a reward to the trust value to increase the trust value when the scanned user fingerprint is substantially the same as a stored user fingerprint in a fingerprint database, store the trust value in the memory as a cumulative trust value for the user, and authenticate the user to allow access to the computer system, otherwise apply a punishment to the trust value to decrease the trust value, and store the trust value as the cumulative trust value for the user, obtain a scanned user fingerprint using a scanner and obtain a captured user face using the camera when the trust value is less than the trust threshold, apply a reward to the trust value to increase the trust value when the scanned user fingerprint is substantially the same as the stored user fingerprint and the captured user face is substantially the same as a stored user face in a face database, store the trust value as the cumulative trust value for the user, and authenticate the user to allow access to the computer system, otherwise apply a punishment to the trust value to decrease the trust value, and store the trust value as the cumulative trust value for the user. When the probability is greater than or equal to the random number, the processing circuitry is configured to read face biometrics of the user using the camera, read fingerprint biometrics of the user using the fingerprint scanner, input a user ID, apply a reward to the trust value to increase the trust value when the scanned user fingerprint is substantially the same as the stored user fingerprint and the captured user face is substantially the same as a stored user face in a face database, store the trust value as the cumulative trust value for the user, and authenticating the user to allow access to the computer system, otherwise apply a punishment to the trust value to reduce the trust value, and store the trust value as the cumulative trust value for the user.

In another exemplary embodiment, a non-transitory computer readable storage medium storing program instructions is described. When executed by processing circuitry, the instructions perform a method for multi-biometric authentication in a computer system. The method includes reading a predefined probability and generating a random number between 0 and 1. When the predefined probability is less than the random number, inputting a user ID and retrieving a trust value for a user from a trust database. When the trust value is greater than a trust threshold, then obtaining a scanned user fingerprint using a fingerprint scanner. When the scanned user fingerprint equals to a stored user fingerprint in a fingerprint database, applying a reward to the trust value to increase the trust value, storing the trust value as a cumulative trust value for the user, and authenticating the user to allow access to the computer system. Otherwise applying a punishment to the trust value to decrease the trust value, and storing the trust value as the cumulative trust value for the user. When the trust value is less than the trust threshold, then obtaining a scanned user fingerprint using a scanner and obtaining a captured user face using a camera. When the scanned user fingerprint is substantially the same as the stored user fingerprint and the captured user face is substantially the same as a stored user face in a face database, applying a reward to the trust value to increase the trust value, storing the trust value as the cumulative trust value for the user, and allowing access to the computer system. Otherwise applying a punishment to the trust value to decrease the trust value, and storing the trust value as the cumulative trust value for the user. When the predefined probability is greater than or equal to the random number, reading face biometrics of the user using the camera; reading fingerprint biometrics of the user using the fingerprint scanner; inputting the user ID. When the scanned user fingerprint is substantially the same as the stored user fingerprint and the read user face is substantially the same as a stored user face in a face database, applying a reward to the trust value to increase the trust value, storing the trust value as the cumulative trust value for the user, and authenticating the user to allow access to the computer system. Otherwise applying a punishment to the trust value to reduce the trust value, and storing the trust value as the cumulative trust value for the user.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
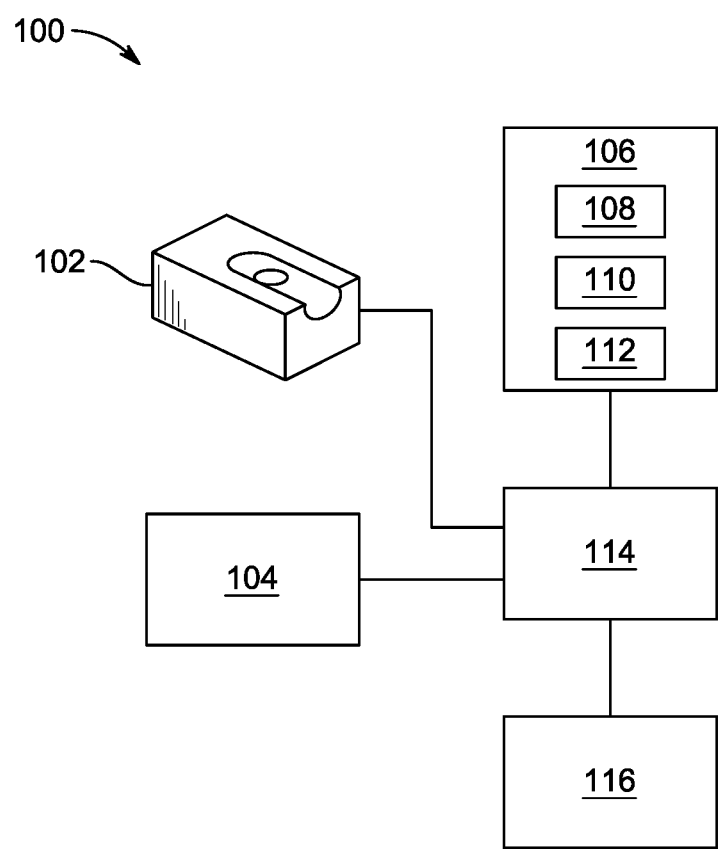
FIG. 1 illustrates a computer system having an energy-efficient multi-biometric authentication, according to aspects of the present disclosure.

In the drawings, like reference numerals designate identical or corresponding parts throughout the several views.

Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

A conventional biometric system works in two stages: enrollment of a user and authentication of the enrolled user. In the enrollment stage, a biometric reference template is extracted from a biometric trait and stored on a server. During the authentication stage, the biometric trait is again received from the user, and a biometric probe template is extracted from the received biometric trait. The biometric system computes a matching score between the stored biometric reference template and the extracted biometric probe template. The biometric authentication system authenticates the user if the matching score is above a predefined threshold range.

Most conventional biometric systems use a single biometric trait to establish a user's identity. However, the biometric systems are vulnerable to spoofing attacks, errors caused by noisy data, intra- and inter-class variations, and non-universality (an inability to obtain meaningful biometric data from a subset of individuals, resulting in a failure-to-enroll (FTE) error). To address these concerns, conventional biometric systems have been upgraded to combine multiple biometric traits ("multi-biometric system"), resulting in increased accuracy. However, this has lead to increased overhead, complexity, form factor, energy, and latency in the multi-biometric system.

Aspects of this disclosure are directed to a method for multi-biometric authentication and a computer system having an energy-efficient multi-biometric authentication. The energy-efficient multi-biometric authentication includes a trust management system (TMS) together with a decision-level multi-biometric system to improve the accuracy and lower the energy consumption of the computer system. The computer system is observed to drop the false positive rate (FPR) value by a factor of four (4), and the energy consumption is reduced by a factor of eight (8). Further, a moving target defense technique is also added to the energy-efficient multi-biometric authentication to lower the false negative rate (FNR). The computer system is able to achieve 16% less FNR and save up to 2.5 times more energy as compared to the TMS.

FIG. 1 illustrates a block diagram of a computer system 100 having an energy-efficient multi-biometric authentication (hereinafter interchangeably referred to as "the system 100"), according to one or more aspects of the present disclosure.

Referring to FIG. 1, the system 100 includes a fingerprint scanner 102, a camera 104, a memory 106, and a processing circuitry 114. In an aspect, the system 100 is an authentication system that includes, but is not limited to, a user device, a desktop computer, a server computer, a door lock for access control, a portable or a mobile device, a laptop, PDA or a cellular telephone, a tablet, a netbook, a wireless terminal, a laptop computer, a hardware token, or any other access control system. The system 100 has communications capabilities that can include, but are not limited to, GPS, Bluetooth Low Energy (BLE), Wi-Fi, EDGE, 2G, 3G, 4G, LTE, wired network, Bluetooth®, Near Field Communications (NFC), Infrared (IR), etc.). The fingerprint scanner 102 is configured to receive user biometric information and convert the biometric information into a scanned user fingerprint. In an example, the fingerprint scanner 102 converts the surface or subsurface of the skin of a fingertip into one or several images. In an aspect, the fingerprint scanner 102 may be an optical scanner, a capacitance scanner, an ultrasonic scanner, and a thermal scanner. In an example, the fingerprint scanner 102 may be installed directly on, or is otherwise coupled to, the system 100. In some examples, the fingerprint scanner 102 can be an integral part of the system 100.

The fingerprint scanner 102 is commutatively coupled to the system 100 over a network. The network may include, but is not limited to, Internet, a wireless "Wi-Fi" network, a cellular telephone network, a local area network, a wide area network, or any other network capable of communicating information between devices. In another example, the system 100, the fingerprint scanner 102, and the camera 104 may utilize one or more wired or wireless communication technologies, such as USB™, Firewire™, Wi-Fi™, WiMax, Thunderbolt™ Infrared, Bluetooth™, Zigbee™, serial port, parallel port, and the like.

The camera 104 is configured to capture an image of user face and generate the image of the captured user face. In an aspect, the camera 104 is configured to record a video (in some examples, image frames) of the user and to process image frames of the recorded video.

The memory 106 is configured to store program instructions. The memory 106 is configured to store preprocessed data. The memory 106 includes a trust database 108, a fingerprint database 110 and a face database 112. The trust database 108 is configured to store a trust value corresponding to each user, and a trust threshold. The fingerprint database 110 is configured to store at least one user fingerprint corresponding to each user. The face database 112 is configured to store at least one user face corresponding to each user. In another aspect, the memory 106 is configured to store a plurality of user profiles, a set of predefined probabilities, a plurality of audio signals, etc. Each of the plurality of user profiles includes pre-stored biometric features of a user, name of the user, a plurality of security questions, a unique user ID, etc. The user can provide biometric features during registration. The memory 106 may include any computer-readable medium known in the art including, for example, volatile memory, such as Static Random Access Memory (SRAM) and Dynamic Random Access Memory (DRAM) and/or nonvolatile memory, such as Read Only Memory (ROM), erasable programmable ROM, flash memories, hard disks, optical disks, and magnetic tapes.

The processing circuitry 114 is configured to execute the program instructions. In an aspect, the processing circuitry 114 is configured to employ preprocessing on the received data (signal) such as filtering and amplifying the received data. The processing circuitry 114 is configured to cooperate with the memory 106 to fetch and execute computer-readable program instructions stored in the memory 106. According to an aspect of the present disclosure, the processing circuitry 114 may be implemented as one or more microcomputers, microprocessors, microcontrollers, digital signal processors, central processing units, state machines, logic circuitries, and/or any devices that manipulate signals based on operational instructions.

The processing circuitry 114 is configured to determine whether the user is an untrusted (untrustworthy) user or a trusted user (trustworthy) by comparing a stored trust value corresponding to the user with the trust threshold. The user having a stored trust value below the trust threshold is determined as the untrusted (untrustworthy) user. The user having the stored trust value above the trust threshold is determined as the trusted user (trustworthy).

In an aspect, the system 100 includes a keypad 116 that is configured to record an input entered by the user. In an example, the input is a user ID. For example, the user ID is a numeric value, a character string, or a combination thereof. In an example, the keypad 116 is selected from the group consisting of a mechanical button keypad and a touchscreen keypad.

In some operative aspects, the system 100 includes an interactive unit that is configured to generate an audio signal for communicating with the user. For example, the interactive unit is configured to generate the audio signal for guiding the user through the authentication process. In an example, the interactive unit includes a speaker and a microphone.

Under the program instructions, the processing circuitry 114 is configured to read a predefined probability from the memory 106 and generate a random number between 0 and 1. In an aspect, a system administrator sets the predefined probability (Pr) while initiating the system 100. The system 100 is configured to operate either as a trust-based multi-biometric system (TMS) or a multi-biometric system. The predefined probability is defined as a probability according to which the system 100 decides whether the system 100 operates as the TMS or the multi-biometric system. The system 100 is configured to choose the multi-biometric system with the probability Pr and the TMS with the probability of (1−Pr).

The system 100 is configured to operate into two modes:
1. When the Predefined Probability is Less than the Random Number:

The processing circuitry 114 is configured to input the user ID from the user via the keypad 116. On inputting the user ID, the processing circuitry 114 is configured to retrieve a trust value for the user from the trust database 108, maintained in the memory 106. The processing circuitry 114 is configured to compare the retrieved trust value with the trust threshold fetched from the memory 106.

In an operative aspect, when the trust value is greater than the trust threshold, the system 100 is configured to operate as the TMS. In the TMS, the processing circuitry 114 is configured to obtain the scanned user fingerprint using the fingerprint scanner 102. The processing circuitry 114 is configured to map the scanned user fingerprint with the stored user fingerprint in the fingerprint database 110.

Fingerprint matching is generally performed using one of two techniques. For purposes of this disclosure, the terms matching and mapping are used interchangeably. One technique is minutiae-based matching, which relies on the location and direction of minutiae points. Another technique is pattern matching, which compares two images to determine how similar they are. In the case of pattern matching, the technique involves forming a numerical model of the fingerprint patterns and comparing the numerical models. Both techniques vary in accuracy of fingerprint recognition. For purposes of this disclosure, fingerprint matching is performed based on a current standard for fingerprint identification, such as ISO/IEC FCD 19794-3, ISO/IEC 27553-1 In the case of minutiae points, a match is declared between two sets of fingerprints based on the number of points in common. In one embodiment, when a fingerprint is used for user authentication, two fingerprints substantially match each other when there are at least 12 points in common. In the case of pattern matching, a match is declared based on a percentage of similarities between numerical models for two fingerprints. In one embodiment, when a fingerprint is used for user authentication, two fingerprints substantially match each other when the similarity between mathematical models of patterns are above 80 percent.

When the scanned user fingerprint is substantially the same as (e.g., substantially maps to/matches) the stored user fingerprint, the processing circuitry 114 applies a reward to the trust value to increase the trust value. The processing circuitry 114 stores the trust value in the memory 106 as a cumulative trust value for the user, and authenticates the user to allow access to the system 100.

If the scanned user fingerprint is not mapped to the stored user fingerprint, then the processing circuitry 114 applies a punishment to the trust value to decrease the trust value. The processing circuitry 114 stores the trust value in the memory 106 as the cumulative trust value for the user, and denies access to the system 100.

In another operative aspect, when the trust value is less than the trust threshold, the system 100 is configured to operate as the multi-biometric system. In the multi-biometric system, the processing circuitry 114 obtains the scanned user fingerprint using the fingerprint scanner 102 and obtains the captured user face using the camera 104.

The processing circuitry 114 is configured to map the scanned user fingerprint with the stored user fingerprint in the fingerprint database 110 and the captured image of a user face with a stored user face image in the face database 112. In an example, the captured user face image and the stored user face image are a set of detected particular features of the user face. For purposes of this disclosure, user face image matching is performed based on a current standard for face recognition, such as ISO/IEC 27553-1. For purposes of this disclosure, the captured user face image and the stored user face image substantially map/match when all of the features that are detected in each face image of the user face match each other. Particular features that are not detected due, for example, to occlusion, noise, shading may not be included in the mapping/matching between images. In some embodiments, a predetermined number of particular features must be in common between a captured user face image and a stored user face image in order for the images to substantially match each other. In cases where the captured user face image lacks the predetermined number of particular features, the processing circuitry can require capturing a new user face image. When the scanned user fingerprint substantially maps to the stored user fingerprint, and the captured user face substantially maps to the stored user face, the processing circuitry 114 applies a reward to the trust value to increase the trust value. The processing circuitry 114 stores the trust value in the memory 106 as the cumulative trust value for the user, and authenticates the user to allow access to the system 100.

If the scanned user fingerprint is not mapped to the stored user fingerprint and the captured user face is not mapped to the stored user face in the face database 112, then the processing circuitry 114 applies a punishment to the trust value to decrease the trust value. The processing circuitry 114 stores the trust value in the memory 106 as the cumulative trust value for the user, and denies access to the system 100.

2. When the Predefined Probability is Greater than or Equal to the Random Number:

When the predefined probability is greater than or equal to the random number, the system 100 is configured to operate as the multi-biometric system. The processing circuitry 114 is configured to obtain the captured user face (face biometrics) using the camera 104 and the scanned user fingerprint (fingerprint biometrics) using the fingerprint scanner 102. The user is asked, using the interactive unit, for inserting the user ID via the keypad 116. On inserting the user ID, the processing circuitry 114 is configured to retrieve the trust value for the user from the trust database 108.

The processing circuitry 114 is configured to map the scanned user fingerprint with the stored user fingerprint in the fingerprint database 110 and the captured user face with the stored user face in the face database 112. When the scanned user fingerprint is substantially the same as the stored user fingerprint, and the captured user face is substantially the same as the stored user face, the processing circuitry 114 applies the reward to the trust value to increase the trust value. The processing circuitry 114 stores the trust value in the memory 106 as the cumulative trust value for the user, and authenticates the user to allow access to the system 100.

If the scanned user fingerprint is not mapped to the stored user fingerprint and the captured user face is not mapped to the stored user face in the face database 112, then the processing circuitry 114 applies the punishment to the trust value to decrease the trust value. The processing circuitry 114 stores the trust value in the memory 106 as the cumulative trust value for the user, and denies access to the system 100.

In an aspect, the processing circuitry 114 is further configured to apply the reward by adding a predetermined reward value to the trust value and apply the punishment by subtracting a predetermined punishment value from the trust value.

In an aspect, the processing circuitry 114 is further configured to determine the cumulative trust value each time the user is authenticated by the system 100. The processing circuitry 114 is configured to update the stored trust value in the memory 106 with the cumulative trust value.

In an operational aspect, the user enters his/her user ID into the system 100 using the keypad 116. The system 100 is configured to fetch the user's trust value from the trust database 108. When the user's trust value is beyond a threshold ($\gamma$), the user is deemed as the trustworthy user, and the system 100 operates as a lighter version of the biometrics system, which contains one or more biometrics with low energy, computation, and latency overheads. For example, only fingerprint of the user is used.

When the user's trust value is less than the $\gamma$, then the user is classified as untrustworthy, and all modalities are used for authentication. For example, both the fingerprint and face modalities are employed. During a verification process, the system 100 compares the features of the user's modalities with the user's features saved in the database. The verification process is of two types; for trusted users, those whose trust value is greater than $\gamma$ only fingerprint is verified, while for untrustworthy users both modalities are used. In any case, when the user passes the verification process, he/she is rewarded. When the user fails the verification process, he/she is punished.

$$T_i = \begin{cases} T_i + \alpha & -1 < T_i < 1 \\ 1 & 1 \le T_i \end{cases}; \qquad (1)$$

$$T_i = \begin{cases} T_i - \beta & -1 < T_i < 1 \\ -1 & -1 \ge T_i \end{cases}; \qquad (2)$$

Equation (1) represents awarding rewards to the user by adding $\alpha$ to the user's trust value and equation (2) represents punishment to the user by subtracting $\beta$ from the user's trust value. In the present disclosure, $\alpha$ and $\beta$ are predetermined values for reward and punishment respectively. The resulting cumulative trust value (after addition or subtraction) is then saved in the trust database 108 (the memory 106) as the user's cumulative trust level ($T_i$). For example, the values of $T_i$ is bounded with the maximum value of trustworthiness as 1 and the minimum value of $-1$.

In the present system 100, initially a plurality of mathematical models is developed that predicts the behavior of the system 100. The developed models are also employed to understand the behavior of the system 100. For example, one model is developed for False Positive Rate (FPR) known as a FPR model, defined as:

$$FPR = \frac{FP}{(FP+TN)}. \tag{3}$$

Another model is developed for False Negative Rate (FNR) known as a FNR model, as defined as:

$$FNR = \frac{FN}{(FN+TP)}. \tag{4}$$

Denoting $\phi$ to be the false positive rate (FPR)—the probability that a malicious user is accepted. Also, denoting $\rho$ to be the false negative rate (FNR)—instances where the benign user is not accepted.

The user should be accepted by both models (FPR model and FNR model) before the users are classified as a valid user. On the contrary, if the user fails at least one of the biometrics, he/she is classified as an invalid user. Therefore, $\phi$ and $\rho$ may be derived from the FPR and FNR of fingerprint biometrics ($\phi_{finger}$, $\rho_{finger}$) and the face detection biometrics ($\phi_{face}$, $\rho_{face}$) respectively. The FPR and FNR of a given user i can be generalized as shown in equations (5) and (6).

$$\phi = \begin{cases} \phi_{face} \times \phi_{finger} & T_i \geq \gamma \\ \phi_{finger} & T_i < \gamma \end{cases}; \tag{5}$$

$$\rho = \begin{cases} \rho_{face} + \rho_{finger} - (\rho_{face} \times \rho_{finger}) & T_i \geq \gamma \\ \rho_{finger} & T_i < \gamma \end{cases}; \tag{6}$$

When the user passes the verification test, he is rewarded with the addition $\alpha$ and when he fails, he is punished with the subtraction of $\beta$ from their cumulative trust value T. The user passes through the multi-biometric system when their trust value is less than the threshold ($\gamma$) and the user passes through a single biometric when their trust value is more than $\gamma$.

Denoting n' and t' to be the number of trials and the trust value of the user, respectively when t'<$\gamma$. Also, denoting n and t to be the number of trials and the trust value of the user respectively when t≥$\gamma$. Therefore, the total number of trials and trust of the user are given by equations (7) and (8), respectively.

$$N = n' + n; \tag{7}$$

$$T = t' + t; \tag{8}$$

The values of t' and t depend on the whether the user is malicious or benign. Equations (9) and (11) are the trust values of malicious users when they are not trusted and when they are trusted by the system 100, respectively. Equations (10) and (12) are the trust values of benign (non-malicious) users when they are not trusted and when they are trusted by the system 100 respectively.

$$t'_{mal} \&= n' \times [\phi \times (\alpha+\beta) - \beta]; \tag{9}$$

$$t'_{ben} \&= n' \times [\alpha - \rho \times (\alpha+\beta)]; \tag{10}$$

$$t_{mal} \&= n \times [\phi_{finger} \times (\alpha+\beta) - \beta]; \tag{11}$$

$$t_{ben} \&= n \times [\alpha - \rho_{finger} \times (\alpha+\beta)]; \tag{12}$$

It can be concluded from the equations (9) and (10) that the user will never cross the threshold if $\phi \times (\alpha+\beta) = \beta$ and $\alpha = \rho \times (\alpha+\beta)$ for malicious and benign users, respectively. Similarly, where n'<0 they nodes will remain under the threshold ($\gamma$). Since $\rho$ is the sum of probabilities then the aforementioned cases are likely to occur for benign nodes (users) than malicious nodes (since $\phi$ is a product of nodes). These two equations (9), (10) are utilized to identify that in order for the system 100 to be energy efficient then (from equation 9) more biometric sensors would be needed. More biometric sensors may lead to quick isolation of malicious nodes, however, (from equation 10) to avoid classifying benign nodes as malicious then the FNR of the biometric sensor must be high.

The system 100 can be modeled using equations (13) and (14) for malicious and benign user respectively, given as below.

$$T_{mal} = (\alpha+\beta) \times [\phi \times n' \phi_{finger} \times n] - \beta \times N; \tag{13}$$

$$T_{ben} = \alpha \times N - (\alpha+\beta) \times [\rho \times n' + \rho_{finger} \times n]; \tag{14}$$

The following examples are provided to illustrate further and to facilitate the understanding of the present disclosure.

Figure 2A:
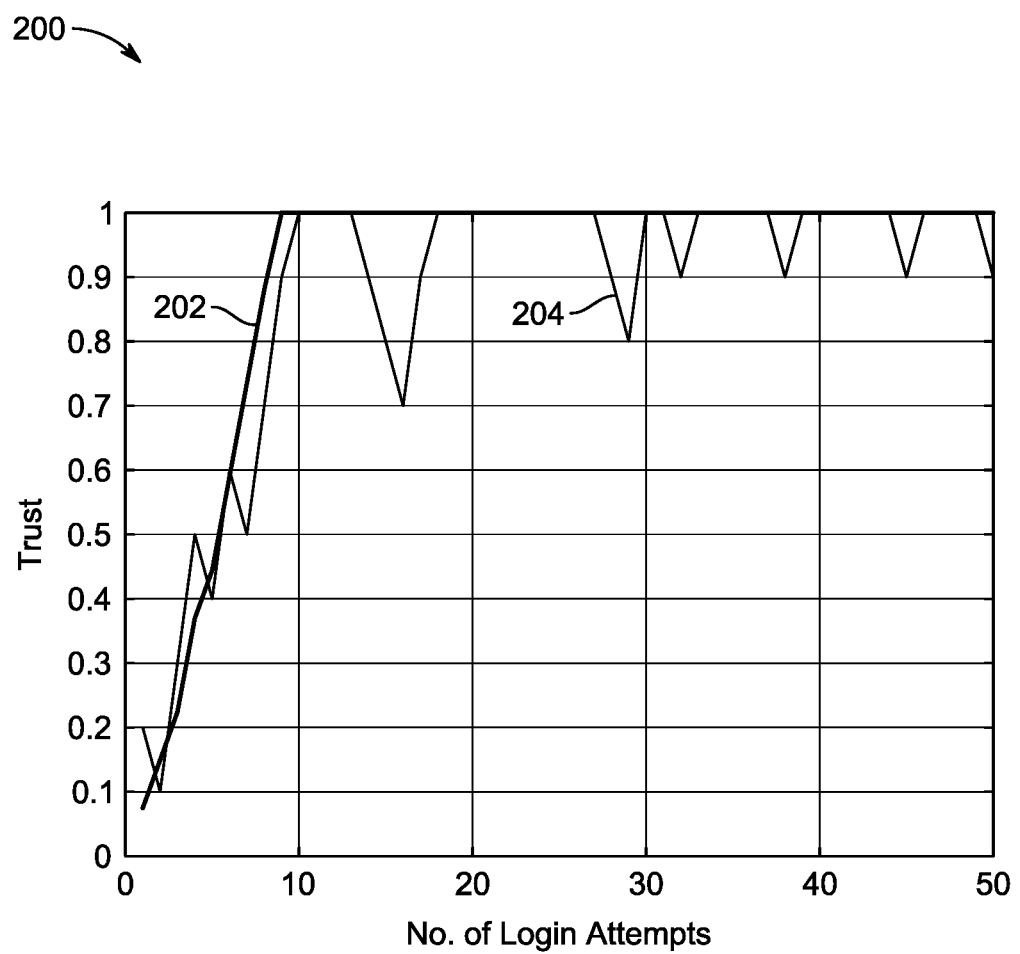
FIG. 2A illustrates a graph representing trust values against trials for a genuine user case, according to aspects of the present disclosure.
Figure 2B:
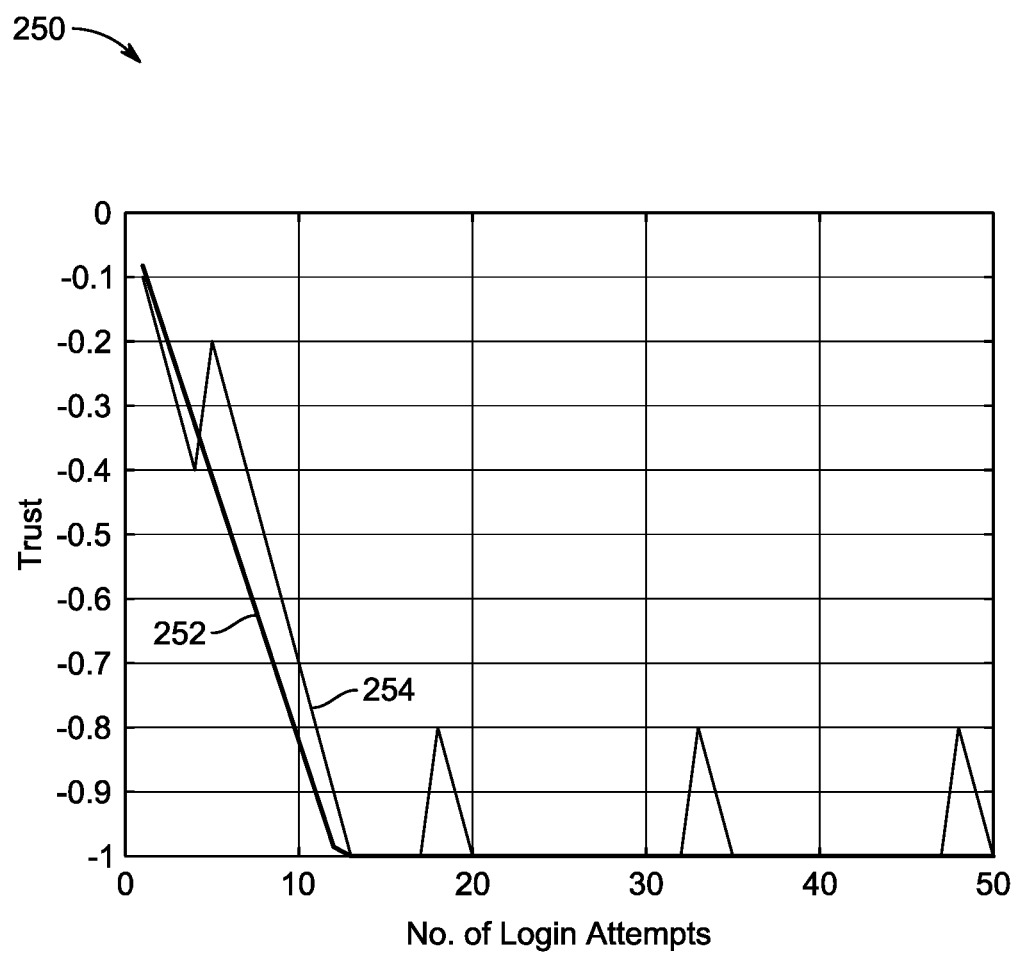
FIG. 2B illustrates a graph representing the trust values against trials for a malicious user case, according to aspects of the present disclosure.

During experimentation, the system 100 was stimulated in MATLAB to validate the mathematical model. FIG. 2A-FIG. 2B illustrates the trust value of the user over fifty login trials. FIG. 2A-FIG. 2B demonstrate a mathematical model that predicts the trust value of the user given the number of trials n' and n. For example, ($\phi=0.06$, $\phi_{finger}=0.21$, $\rho=0.42$ and $\rho_{finger}=0.18$) were taken.

FIG. 2A illustrates a graph 200 representing the trust value against trials for a genuine user case. FIG. 2A explains validation of equation (14) using simulation. Signal 202 represents the experimental result and signal 204 represents the developed mathematical model of the present system 100.

FIG. 2B illustrates a graph 250 representing the trust values against trials for a malicious user case. FIG. 2B explains validation of equation 13 using simulation. Signal 252 represents the experimental result and signal 254 represents the developed mathematical model of the present system 100.

Figure 3:
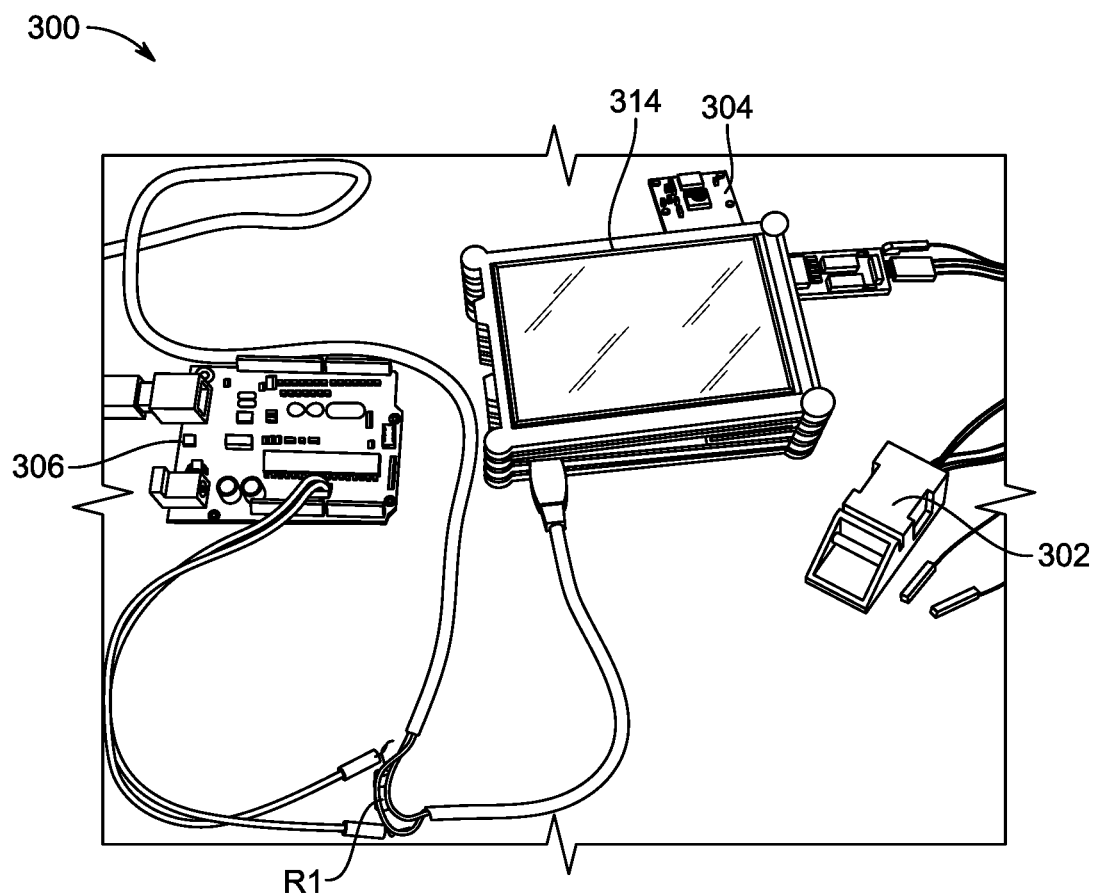
FIG. 3 illustrates an experimental setup to examine energy consumption for the computer system having the energy-efficient multi-biometric authentication, according to aspects of the present disclosure.

FIG. 3 illustrates an experimental setup 300 to examine energy consumption of the system 100, according to aspects of the present disclosure. The performance of the system 100 was investigated using the experimental setup 300. As shown in FIG. 3, the experimental setup 300 includes an authentication device 314 (the processing circuitry 114), a camera 304, and a fingerprint scanner 302. For example, a Raspberry Pi 3 B+ is used as the authentication device 314. In an aspect, a Raspberry Pi camera or the Pi's camera module is used to capture facial features of the user. In an example, the DY50 fingerprint scanner 302 is used for capturing fingerprint features of the user. Further, a pyfingerprint code, available in public domain, was used for interfacing the fingerprint scanner 302 with the Raspberry Pi 3 B+. The pyfingerprint code is available to test the Raspberry Pi 3 B+ with the fingerprint scanner 302.

The pyfingerprint code was used in developing the fingerprint authentication part of the system 100. For the face biometrics, OpenCV (Open Source Computer Vision Library) was used. The OpenCV is a library of programming functions mainly for real-time computer vision. In the experimental setup 300, an Arduino Uno 306 was used to capture the instantaneous power over time. As shown in FIG. 3, a 1Ω resistor R1 was connected along the live wire, making a series connection with the load 314 (i.e., Raspberry Pi). The voltage across the 1Ω resistor R1 was measured by connecting two wires across the 1Ω resistor R1. The wire at the node near the power source was connected to the analog (A0) pin of the Arduino Uno 306, while the other wire was connected to the ground (GND) pin of the Arduino Uno 306. The analog input was sampled after every 5 ms, and the result was printed on an Arduino serial terminal. The resulting energy consumption of fingerprint enrolment was 0.50 J as fingers were scanned twice during each enrolment. During the fingerprint authentication, the user scanned his fingerprint, and the fingerprint template was searched in the fingerprint database 110. When the fingerprint was found (a hit), the user was successfully authenticated. But when the fingerprint was not found (a miss), the user was not authorized. The energy consumption of hit and miss operations was 0.34 J and 0.31 J, respectively. For facial features, the power consumption due to initialization, camera, learning, and recognition were 0.28 W, 0.79 W, 0.28 W and 0.46 W, respectively. Table 1 shows the energy consumption of enrolment and the detection of each biometric technique and the amount of time it takes.

TABLE 1

Simulation Parameters during experimentation

| Serial No. | Metric | Values (Finger) | Values (Face) | Comment |
| --- | --- | --- | --- | --- |
| 1 | False Positive | 21.50% | 27.70% | Obtained from a conventional system. |
| 2 | False Negative | 18.20% | 28.80% | |
| 3 | Enroll Time | 5.09 s | 45.80 s | Obtained from the experiment of the present system 100 |
| 4 | Hit Time | 2.22 s | 3.25 s | |
| 5 | Miss Time | 2.18 s | | |
| 6 | Training Time | — | 51.40 s | |
| 7 | Enroll Energy | 0.50 J | 13.40 J | |
| 8 | Hit Energy | 0.34 J | 2.54 J | |
| 9 | Miss Energy | 0.31 J | | |
| 10 | Training Energy | — | 14.70 J | |

To examine the performance of the system 100, during the experimentation, the simulation parameters as given in in Table 1 were used. During the experimentation, following assumptions were considered:

1) The fingerprints and facial features have already been enrolled and the system 100 has been trained to recognize the biometric modalities with accuracy as mentioned in Table 1.

2) A set of 100 users have been enrolled with 10% malicious users (i.e., spoof attackers).

3) The system 100 saves the trust value of each of the user and keeps track of the trust value. Each time the user tries to log in he/she is rewarded or punished depending on whether the login is successful, or it is a failure, respectively.

4) In each iteration, the user arrival is modeled as a Poisson process with a mean arrival time of 6 min. The Poisson process is usually used in scenarios where the occurrences of certain events are counted that appear to happen at a certain rate, but completely at random (without a certain structure).

Figure 4A:
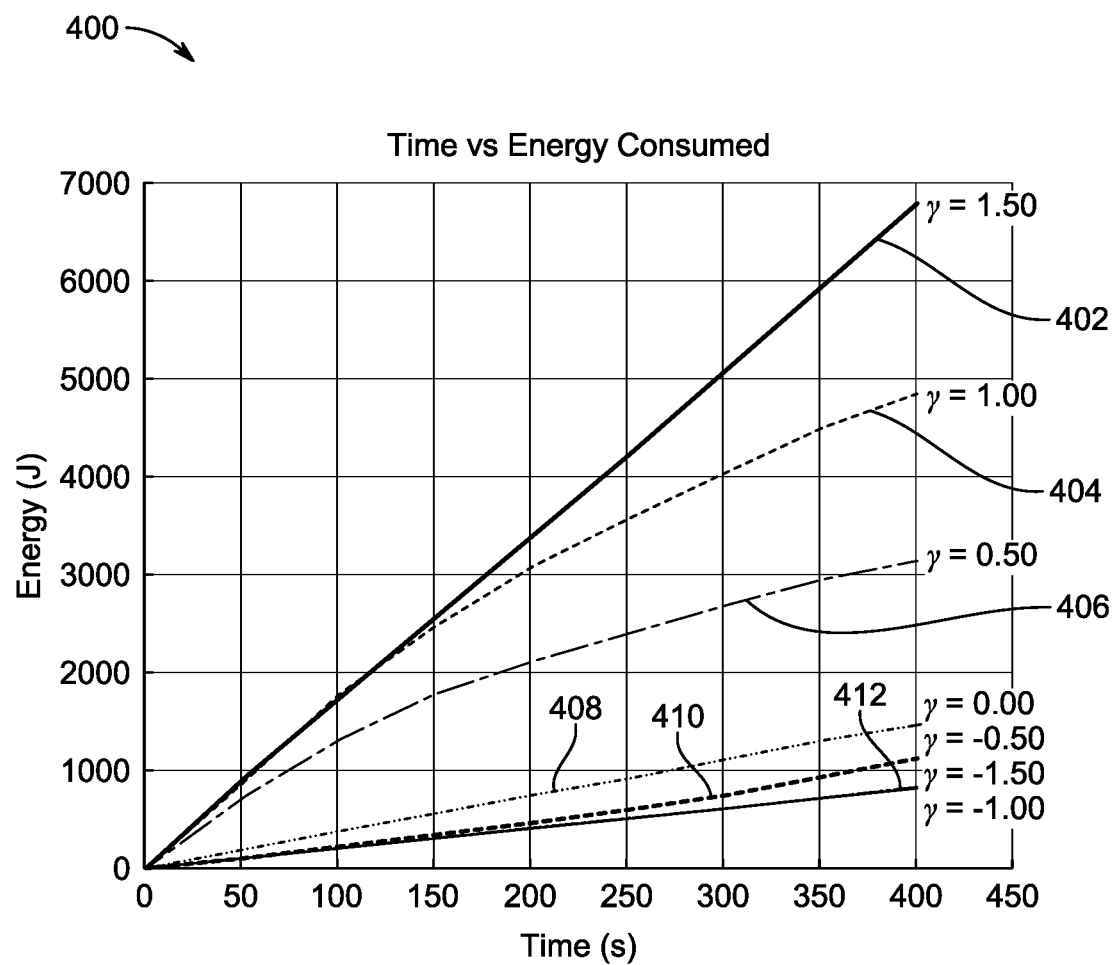
FIG. 4A illustrates a graph of the energy consumption over time for first 400 sec, according to aspects of the present disclosure.
Figure 4B:
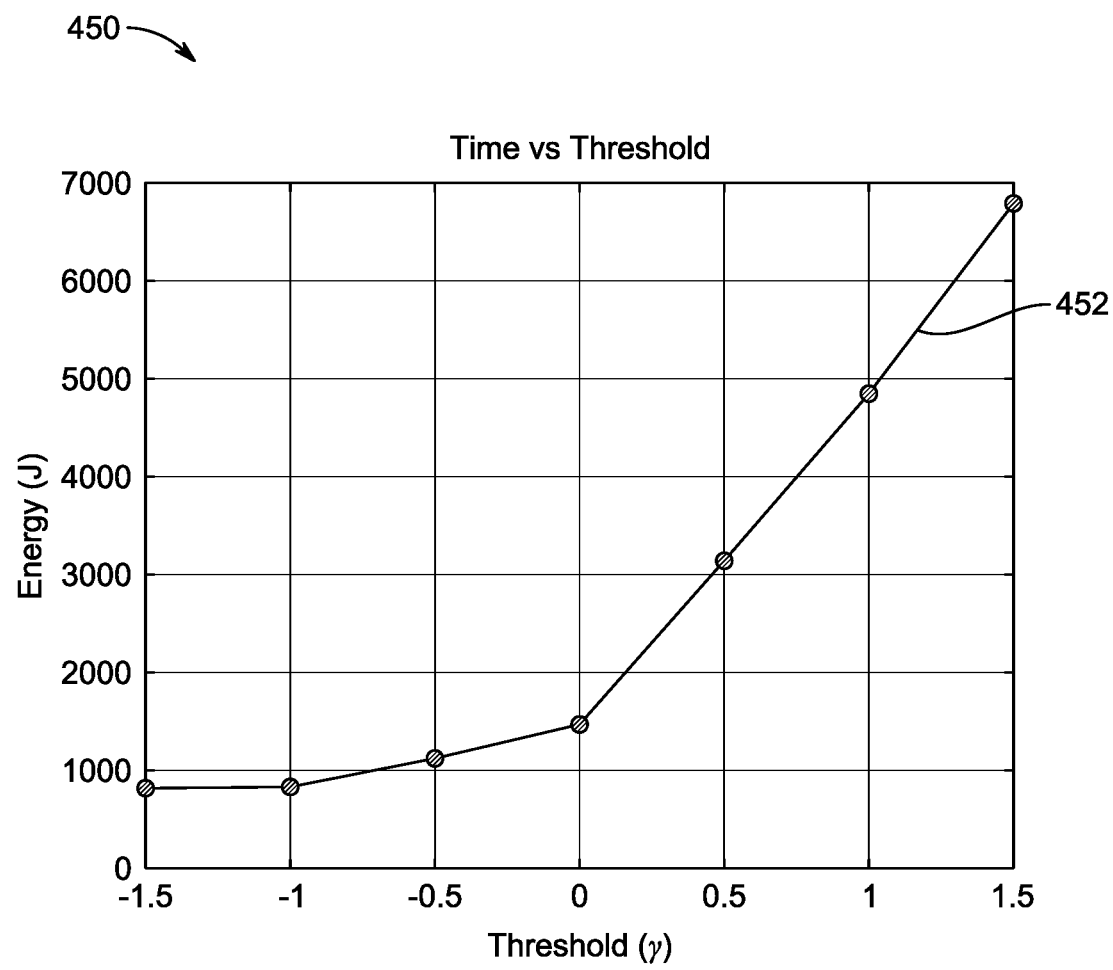
FIG. 4B illustrates a graph of the energy consumption after 400 sec, according to aspects of the present disclosure.

FIG. 4A-FIG. 4B show the performance of the system 100. The most important part of any Internet of Things (IoT) system is to conduct various operations with minimum energy consumption.

FIG. 4A illustrates a graph 400 of the energy consumption of the system 100 over time for the first 400 sec. FIG. 4A show the energy consumption of the system 100 when the reward is 0.2 and punishment of 0.1 at different threshold values of trust. Signal 402 indicates the energy consumption when $\gamma=1.50$. Signal 404 indicates the energy consumption when $\gamma=1.00$. Signal 406 indicates the energy consumption when $\gamma=0.50$. Signal 408 indicates the energy consumption when $\gamma=0$. Signal 410 indicates the energy consumption when $\gamma=-0.50$.

Signal 412 indicates the energy consumption when $\gamma=-1.00$ and $\gamma=-0.50$. It can be seen that at $\gamma=-1.50$ and $\gamma=1.50$, the energy consumption is linear because the users' trust cannot be lower than −1.0 or higher than 1.0 respectively. However, the slope at $\gamma=1.5$ is larger because, the users are not trustworthy throughout the simulation time. The users go through both fingerprint and face biometrics at all times of the simulation. When $\gamma=-1.5$, the users are trusted all the time. Therefore, only the fingerprint modality is used, providing a lower slope (i.e., energy consumption rate).

For values within the boundary (i.e., between 1.0 and −1.0), the graph 400 has three parts. For example, at $\gamma=0.5$, the energy consumption is linear from time=0 s to time=50 s, the energy consumption is exponential between time=50 s and time=350 s, and the energy consumption is linear afterwards. The first stage is linear because all users are building their reputation, hence, the energy consumption is due to both face and fingerprint biometrics. The second stage is exponential because it is a transition phase where some users cross the threshold (in both directions) with each iteration. The larger the number of users crossing the threshold, the sharper the bend. However, the number of users crossing the threshold depends on how far $\gamma$ is to the initial trust value of the users, since the users find it easier to reach a trustworthy level. Thus the observation that the transition phase shortens and occurs earlier as the value of the threshold approaches zero. The third stage is the point where most users have been classified as either the trustworthy user or untrustworthy user, hence the energy consumption is roughly linear.

FIG. 4B illustrates a graph 450 of the energy consumption of the present system 100 after 400 sec. Signal 452 represents a change in energy consumption with a change in threshold value of the trust at time=400 s. As observed from FIG. 4B, the simulation time is stopped early to observe the changes immediately after the system 100 is installed before the system 100 starts forming opinions of the users. The trend shows that the increase in the energy consumption is exponential as the user moves from threshold values of −1.5 to 1.5. For trust values greater than 1.0, the energy consumption is maximum, and the energy consumption becomes fixed because $\gamma=1.0$ is the upper bound of the threshold for the system 100; as such the two biometric modalities must be used at all times. When the threshold is less than −1, the face biometrics is never used. Therefore, the energy consumption is the sum of the energy consumption due to the fingerprint biometrics for all the users over a given time.

Figure 5A:
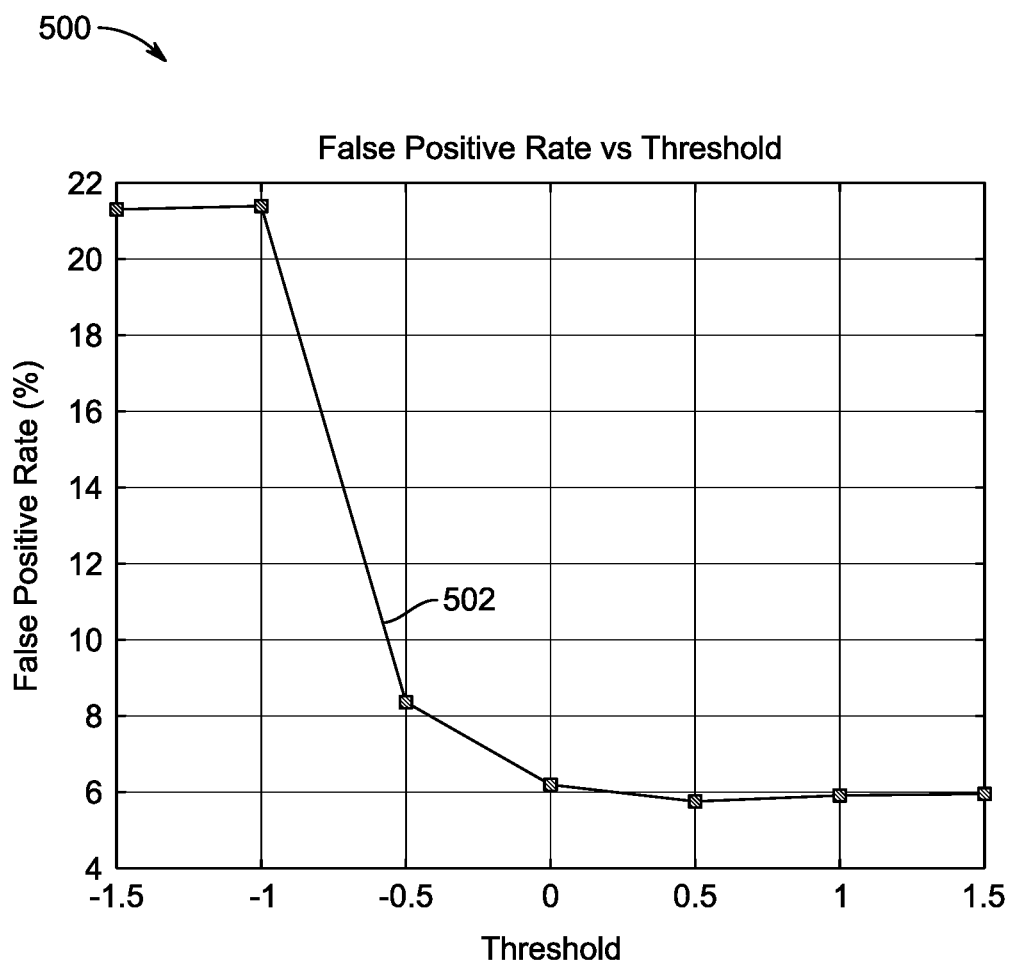
FIG. 5A illustrates a graph representing a false positive rate (FPR) versus threshold value, according to aspects of the present disclosure.
Figure 5B:
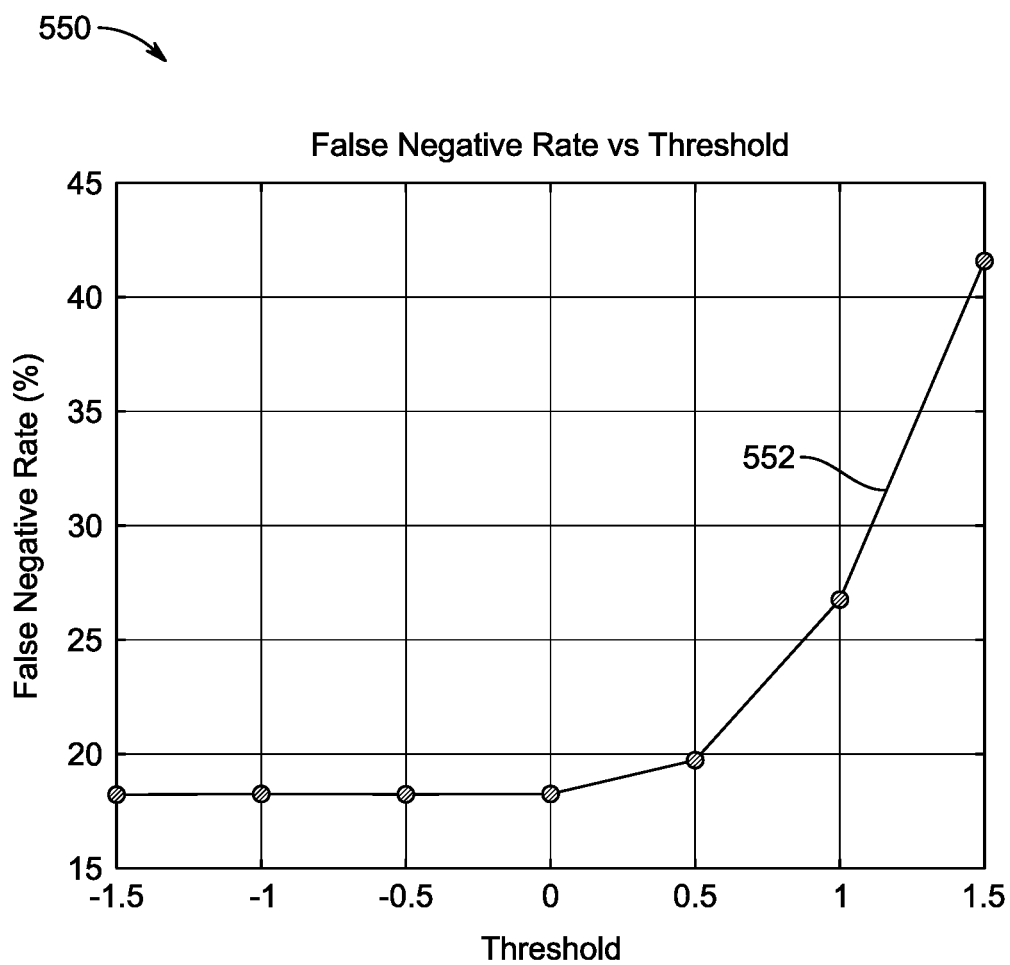
FIG. 5B illustrates a graph representing a false negative rate (FNR) versus threshold value, according to aspects of the present disclosure.

FIG. 5A-FIG. 5B show the performance of the system 100 in terms of accuracy. FPR is the ratio of false positive (FP) cases to total instances involving malicious user (i.e., false positives (FP) and true negatives (TN)), while FNR is the ratio of the false negative (FN) trials to the total instances non-malicious user (i.e., false negatives (FN) and true positives (TP)) as shown in equations (3) and (4), respectively.

A TP metric represents the percentage of instances where a non-malicious user was correctly recognized. A TN metric represents the percentage of instances where the malicious users correctly were recognized. A FP metric is the percentage of instances where the system 100 classifies the malicious users as non-malicious ones, while a FN metric is the percentage of instances where the system 100 classifies non malicious users as malicious ones. In an example, the sum of the four metrics (TP metric, TN metric, FP metric, FN metric) is equal to 100%.

FIG. 5A illustrates a graph 500 representing the FPR versus threshold values. Signal 502 indicates the FPR corresponding to the threshold values in the range of [−1.5, 1.5]. FIG. 5B illustrates a graph 550 representing the FNR versus threshold values. Signal 552 indicates the FNR corresponding to the threshold values in the range of [−1.5, 1.5]. In an aspect, TP, TN, FP and FN were measured between a threshold range of [−1.5, 1.5]. From the measured values of the TP, TN, FP and FN, the FPR and the FNR were calculated using equations 3 and 4. The simulation was stopped after 2,000 s. The objective of the system 100 is to decrease both FPR and FNR by combining the two modalities (fingerprint and face) as compared to their individual values in the different biometric techniques.

When the threshold value $\gamma=1.5$ is chosen, the two modalities (i.e., fingerprint and face) are always used. The probability of the FNR will greatly increase since the user will be classified as an intruder if he/she fails the fingerprint or the face or both tests. The FNR can be mathematically modeled by equation (15) given as below:

Considering FNR=$\phi$, $$\phi=\phi_{finger}+\phi_{face}-(\phi_{finger}\times\phi_{face})$$

$$=0.182+0.288-(0.182\times 0.288)$$

$$\approx 41.76\% \quad (15)$$

Equation (15) provides a same value as seen in the simulation.

The FPR drop since the users must pass both the fingerprint test and the face detection test to be classified as a non-malicious user. The results were validated during the experimentation using equation (16).

Considering FPR=$\rho$ $$\rho=\rho_{finger}\times\rho_{face}$$

$$=0.215\times 0.277$$

$$\approx 5.96\% \quad (16)$$

All nodes (users) have an initial trust value of zero. Moreover, the nodes cannot reach the threshold value ($\gamma=-1.5$). When $\gamma=-1.5$, then the system 100 starts to trust all users, resulting the trusted users (i.e., all the users) only use fingerprint detection. Hence, the FPR=$\rho_{finger}$=21.50% and the FNR=$\phi_{finger}$=18.20%, is confirmed by the simulation as shown in FIG. 5A and FIG. 5B, respectively.

Finally, the values between the range $-1\leq\gamma\geq 1.0$ also behave as predicted. The value of the FPR gradually reduces as $\gamma$ is increased because increasing $\gamma$ raises the bar for trusting the users, thereby forcing the system 100 to use both modalities. The frequency of usage of both modalities increases with increase in $\gamma$, thus the FPR also decreases. The value of the FNR increases with increase in values of $\gamma$ because more the system 100 uses both biometrics, the higher the tendency that the non-malicious users come up as malicious users, since they must pass both biometrics.

In the present disclosure, a specific security technique (trust management system) is incorporated into decision level multi-biometric to improve the malicious user detection of the system 100 while reducing the energy consumption of the system 100. In an aspect, the trust management system is used to handle the dynamic evaluation of trustworthiness. The trust management system tracks nodes past interactions in the network to detect malicious attacks and selfish attitudes. It is observed that there is no exact trust threshold value that will provide the best value for all the parameters (i.e., energy, TP, TN, FP, and FN). However, the threshold value of 0 is an optimal value within the limits of the experiment carried out, when the initial trust value of the users is 0.

Figure 6:
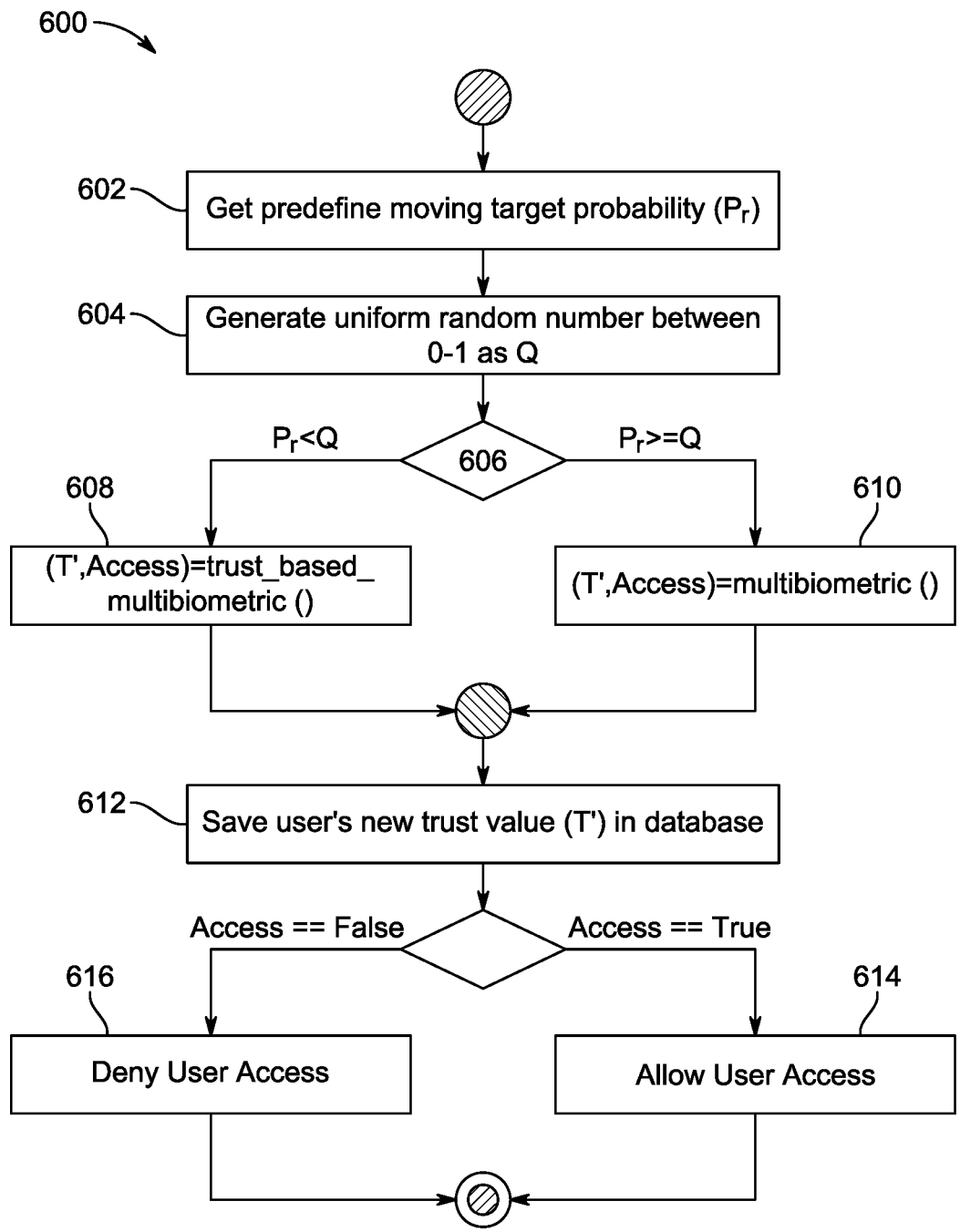
FIG. 6 illustrates a working flowchart of a moving target defense multi-biometric system (MTMS), according to aspects of the present disclosure.

FIG. 6 illustrates a working flowchart 600 of a moving target defense multi-biometric system (MTMS), according to aspects of the present disclosure. The system 100 employs a moving target defense (MTD) to reduce the FNR. The MTD is a defense strategy where a system switches between different methods to prevent an attacker. The MTD is the concept of controlling change across multiple system dimensions in order to increase uncertainty and apparent complexity for attackers, reduce their window of opportunity and increase the costs of their probing and attack efforts. In the system 100, the MTD switches between the TMS and the multi-biometric system.

Step 602 includes getting, via the processing circuitry 114, a predefined moving target probability ($P_r$). In an example, the system administrator may provide a value "$P_r$".

Step 604 includes generating, via the processing circuitry 114, a random number between 0-1 as Q. The system 100 uses the generated random number to choose one of the working operations. The system 100 chooses to operate as the multi-biometric system with the probability $P_r$ and as the trust-based multi-biometric system (TMS) with the probability of (1-$P_r$).

Step 606 includes determining whether the predefined probability is greater than or equal to the random number.

When the $P_r$ is less than the Q, the system 100 is configured to operate as the TMS. The TMS performs step 608 that includes inputting, via the processing circuitry 114, a user ID and retrieving a trust value for the user from a trust database 108.

When the trust value is greater than the trust threshold, then step 608 includes obtaining the scanned user fingerprint using the fingerprint scanner 102. The processing circuitry 114 configured to map the scanned user fingerprint with the stored user fingerprint fetched from the fingerprint database 110. If the scanned user fingerprint is substantially the same as the stored user fingerprint, then the processing circuitry 114 applies the reward to the trust value to increase the trust value.

Step 612 includes storing the trust value as the cumulative trust value for the user. Step 614 includes authenticating the user to allow access to the system 100.

If the scanned user fingerprint is not equal to the stored user fingerprint, then step 608 includes applying a punishment to the trust value to decrease the trust value. Step 612 includes storing the trust value as the cumulative trust value for the user. Step 616 includes denying access to the system 100.

When the trust value is less than the trust threshold, then step 608 includes obtaining the scanned user fingerprint using the fingerprint scanner 102 and obtaining the captured user face using the camera 104. The processing circuitry 114 configured to map the scanned user fingerprint with the stored user fingerprint fetched from the fingerprint database 110. If the scanned user fingerprint is substantially the same as the stored user fingerprint, then the step 608 includes applying the reward to the trust value to increase the trust value. Step 612 includes storing the trust value as the cumulative trust value for the user. Step 614 includes authenticating the user to allow access to the system 100.

If the scanned user fingerprint is not equal to the stored user fingerprint, then step 608 includes applying the punishment to the trust value to decrease the trust value. Step 612 includes storing the trust value as the cumulative trust value for the user. Step 616 includes denying access to the system 100.

Figure 7:
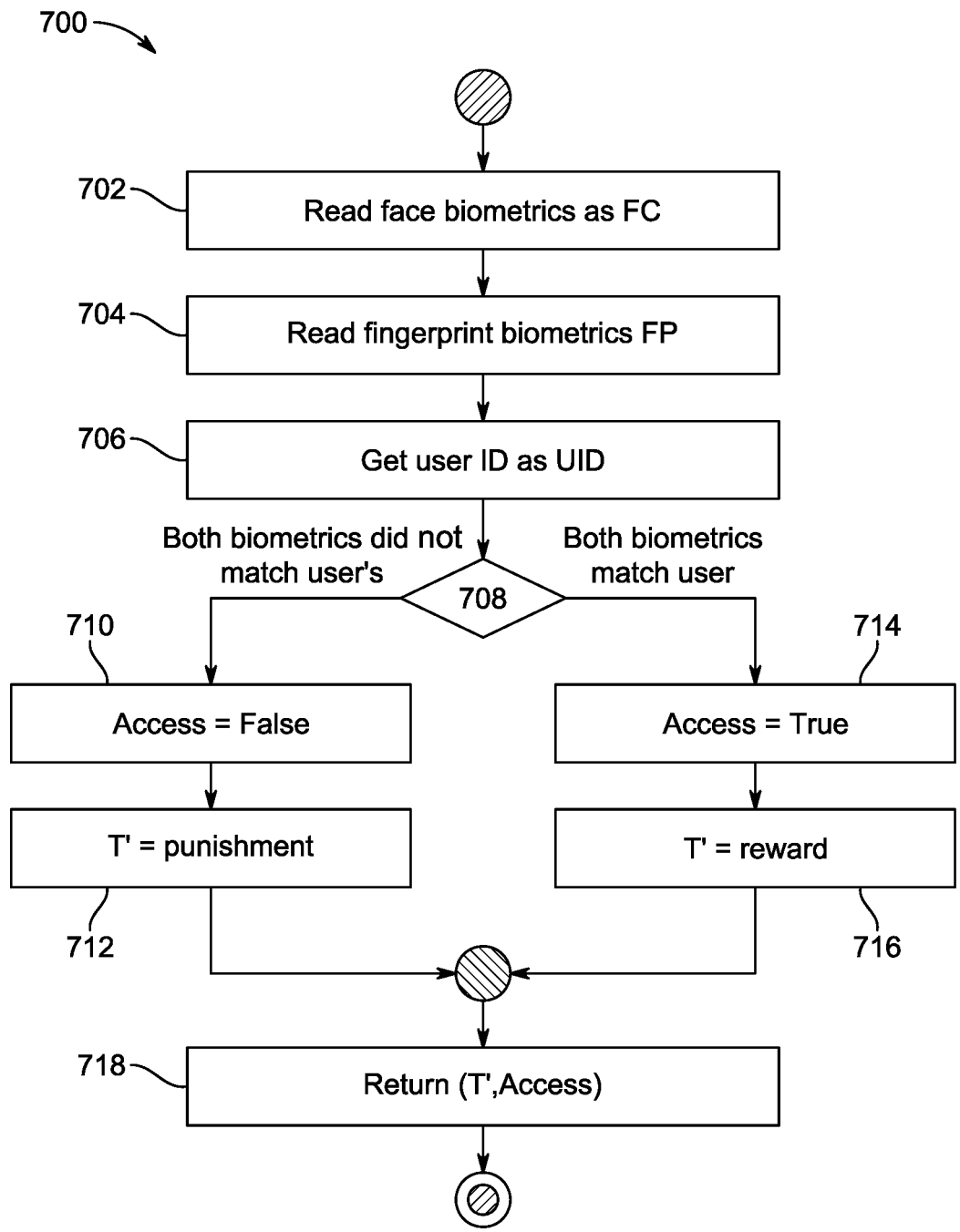
FIG. 7 illustrates a working flowchart of a multi-biometric system, according to aspects of the present disclosure.

When the probability is greater than or equal to the random number, the system 100 is configured to operate as the multi-biometric system (as explained in FIG. 7). The multi-biometric system performs step 610 that includes reading face biometrics. Step 610 further includes reading fingerprint biometrics. Step 610 further includes inputting the user ID. The processing circuitry 114 is configured to substantially map the scanned user fingerprint with the stored user fingerprint fetched from the fingerprint database 110 and to substantially map the captured user face with the stored user face fetched from the face database 112. When the scanned user fingerprint is substantially the same as the stored user fingerprint and the captured user face is substantially the same as the stored user face in the face database 112, step 610 further includes applying the reward to the trust value to increase the trust value. Step 612 includes storing the trust value as the cumulative trust value for the user. Step 614 includes allowing access to the system 100.

When the scanned user fingerprint is not equal to the stored user fingerprint and the captured user face is not equal to the stored user face in the face database 112, step 610 applies a punishment to the trust value to reduce the trust value. Step 612 includes storing the trust value as the cumulative trust value for the user. Step 616 includes denying access to the system 100. In the TMS, the system 100 reads the user's trust value "T". If T is above a predefined threshold value γ, the system 100 only uses the lightweight biometric system (fingerprint biometrics). However, if the value is less than γ then the system 100 uses the multi-biometric mode (i.e., it uses both the face and the fingerprint biometrics) for authentication.

When the system 100 chooses the multi-biometric system, the system 100 uses both face biometric and fingerprint biometric together as shown in FIG. 7. The user is authenticated to allow access to the protected system 100 only when both of the biometrics substantially match their stored biometrics. Otherwise the access is denied.

FIG. 7 illustrates a working flowchart 700 of the multi-biometric system, according to aspects of the present disclosure.

Step 702 includes reading face biometrics as FC using the camera 104.

Step 704 includes reading fingerprint biometrics as FP using the fingerprint scanner 102.

Step 706 includes inputting the user ID as UID.

Step 708 includes mapping the scanned user fingerprint biometrics with the stored user fingerprint fetched from the fingerprint database 110 and the captured face biometrics with the stored user face fetched from the face database 112.

When the scanned user fingerprint is not equal to the stored user fingerprint and the captured user face is not equal to the stored user face in the face database 112, step 710 includes denying access to the system 100. Step 712 includes applying the punishment to the trust value to reduce the trust value. Step 718 includes storing the trust value as the cumulative trust value for the user.

When the scanned user fingerprint biometrics are substantially equal to the stored user fingerprint and the captured user face is substantially the same as the stored user face in the face database 112, step 714 includes authenticating the user to allow access to the system 100. Step 716 further includes applying the reward to the trust value to increase the trust value. Step 718 includes storing the trust value as the cumulative trust value for the user.

Figure 8A:
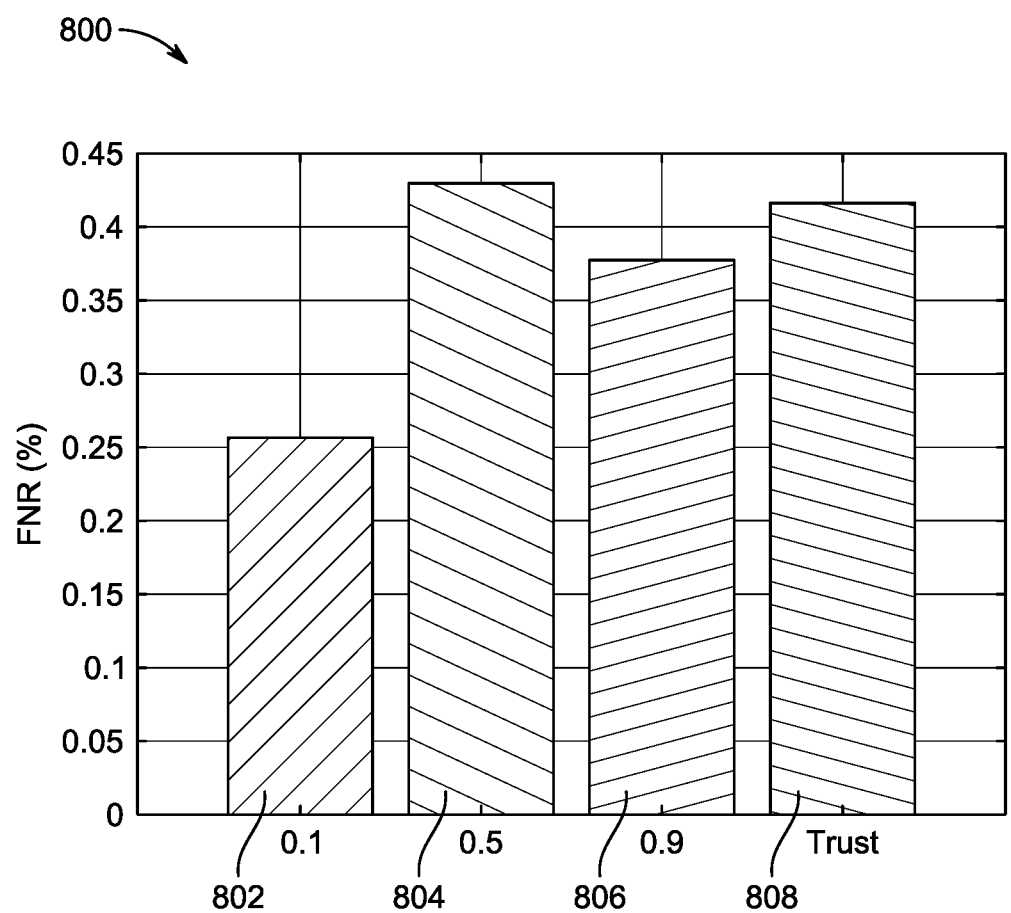
FIG. 8A illustrates a graph of performance of the MTMS as compared with a trust management system (TMS) in terms of the FPR, when the TMS is in a best configuration, according to aspects of the present disclosure.
Figure 8B:
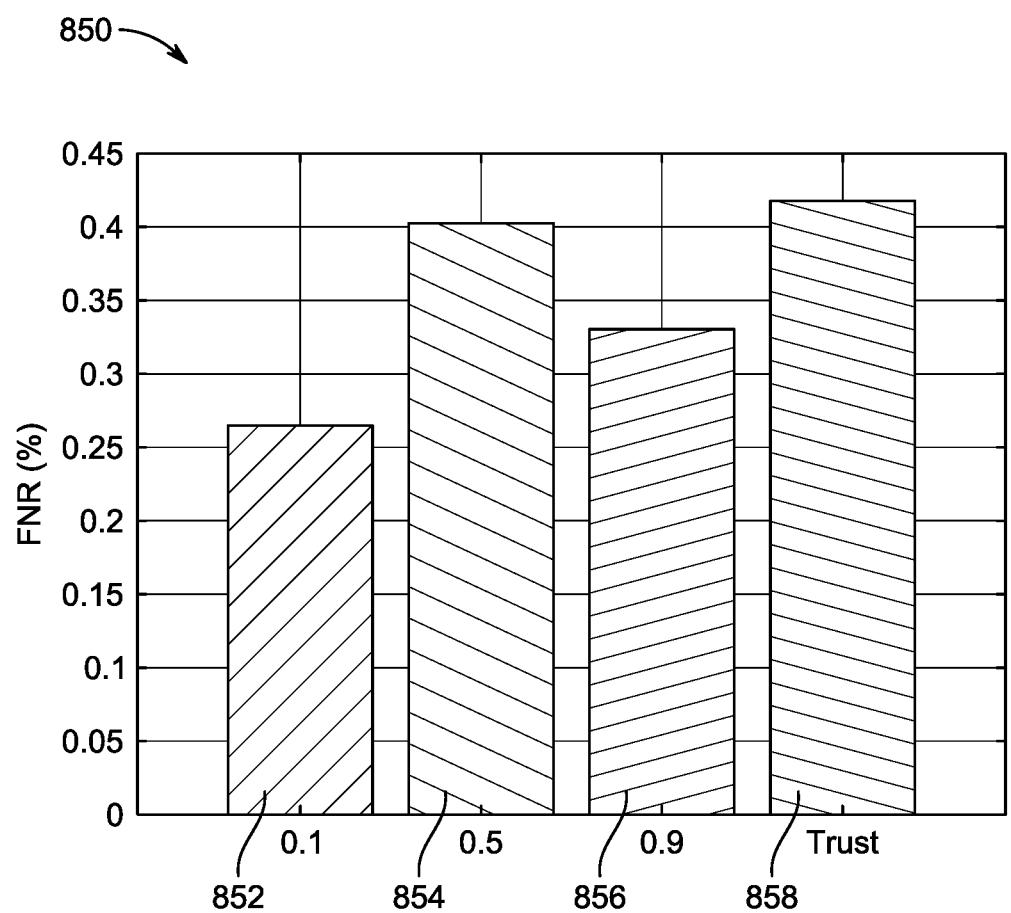
FIG. 8B illustrates a graph of the performance of the MTMS as compared with the TMS in terms of the FPR, when the TMS is in a worst configuration, according to aspects of the present disclosure.

FIG. 8A-FIG. 8B show the performance of the moving target-based multi-biometric system (MTMS) at different values of $P_r$ as compared to the trust-based multi-biometric system (TMS). The X-axis shows the value of "$P_r$" for the MTMS and the result for the TMS is labeled as "trust". The Y-axis is the FNR in percentage values between 0 and 1. The modification of the system 100 aims to reduce the false-negative rate (FNR) of the access control system. The FNR is the ratio of the legitimate users that were perceived as malicious (see equation 4).

FIG. 8A illustrates a graph 800 of the performance of the MTMS as compared with the TMS that offers the best energy efficiency. Line 802 represents a FNR value of the MTMS when $P_r=0.1$. Line 804 represents a FNR value of the MTMS when $P_r=0.5$. Line 806 represents a FNR value when $P_r=0.9$. Line 808 represents a FNR value of the TMS.

FIG. 8B illustrates a graph 850 of the performance of MTMS in comparison with the TMS that shows the worst energy efficiency. Line 852 represents a FNR value of the MTMS when $P_r=0.1$. Line 854 represents a FNR value of the MTMS when $P_r=0.5$. Line 856 represents a FNR value of the MTMS when $P_r=0.9$. Line 858 represents a FNR value of the TMS.

TABLE 2

| Defined TMS settings | | | |
|---|---|---|---|
| Multi-biometric | Reward (α) | Punishment (β) | Threshold (γ) |
| Best | 0.6 | 0.2 | 0.3 |
| Worst | 0.6 | 0.5 | 0.5 |

The MTMS shows a lower FNR as compared to both TMSs (in worst configuration as well as best configuration). However, in both cases (in worst configuration as well as best configuration) the MTMS with $P_r=0.1$ shows the lowest FNR. When $P_r=0.1$, only 10% of total authentication sessions used the multi-biometric technique, while the 90% of authentication sessions used TMS. This shows that the present system 100 achieves the objective of decreasing both FPR and FNR by combining the two modalities (fingerprint and face). At $P_r=0.5$, the system 100 shows the worst performance because the system 100 oscillates; constantly moving trusted users; yielding up and down the threshold, γ. At $P_r=0.9$, the system 100 shows poor performance (although not as poor as $P_r=0.5$) because the majority of the time (90% of the time) the MTMS uses the multi-biometric system 100 that requires users to pass both biometrics before being considered legitimate users, making it hard for benign users to pass.

Figure 9A:
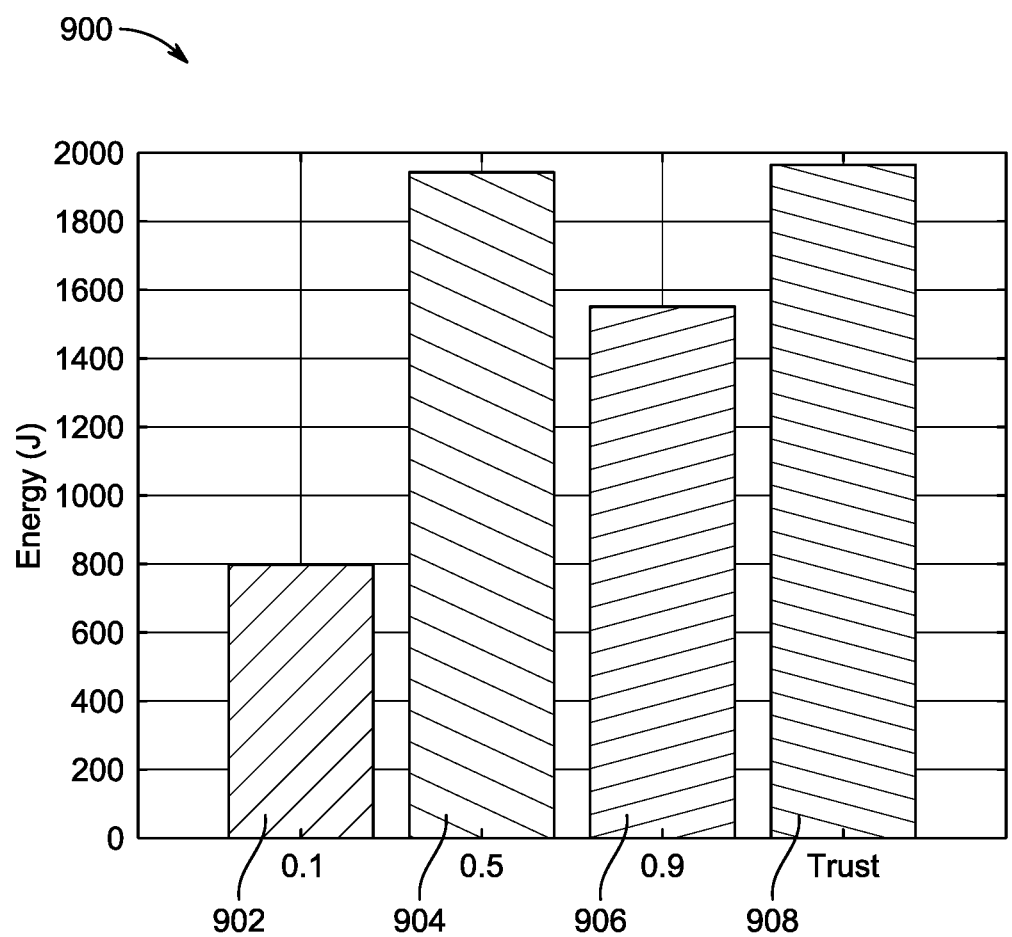
FIG. 9A illustrates a graph of energy consumption of the MTMS in comparison with the TMS, when TMS is in the best configuration, according to aspects of the present disclosure.
Figure 9B:
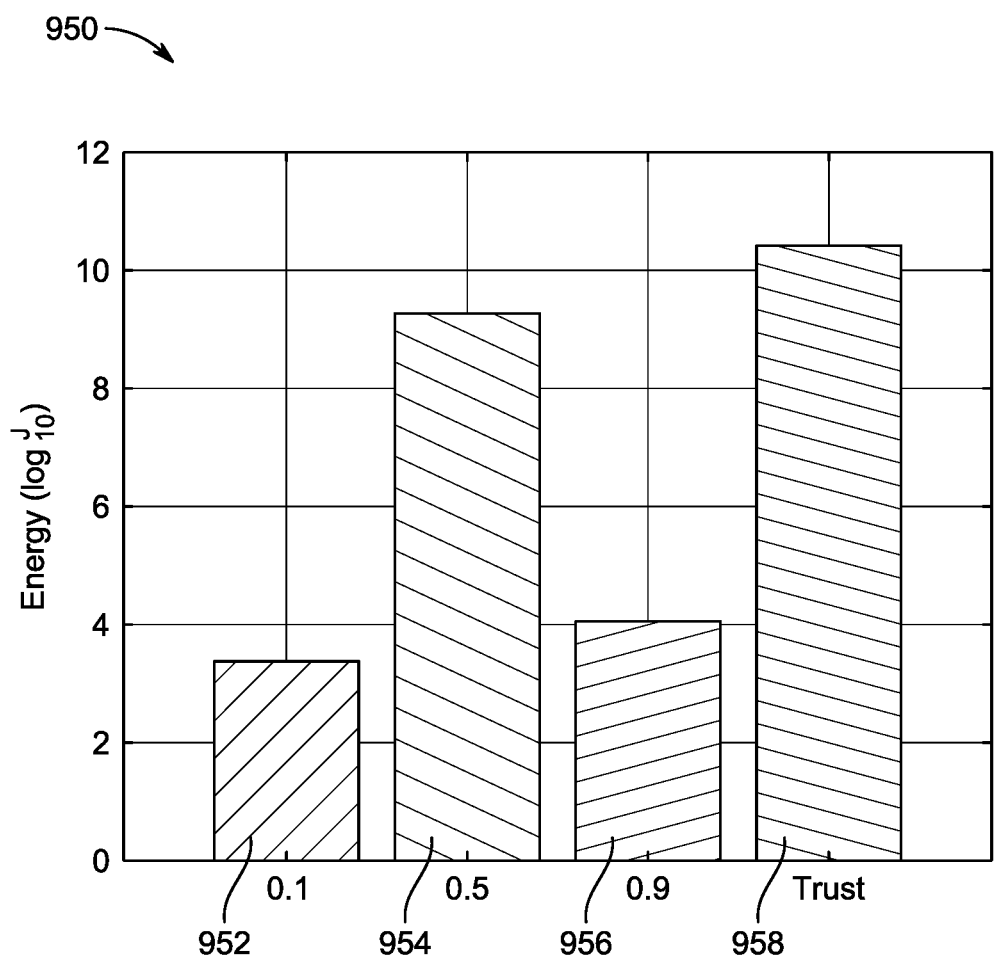
FIG. 9B illustrates a graph of the energy consumption of the MTMS in comparison with the TMS, when the TMS is in the worst configuration, according to aspects of the present disclosure.

FIG. 9A-FIG. 9B show the energy consumption (in joules) of both the MTMS and the TMS. FIG. 9A illustrates a graph 900 of the energy consumption of MTMS in comparison with the TMS, when TMS is in the best configuration. Line 902 represents energy consumption of the MTMS when $P_r=0.1$. Line 904 represents energy consumption of the MTMS when $P_r=0.5$. Line 906 represents energy consumption of the MTMS when $P_r=0.9$. Line 908 represents energy consumption of the TMS.

FIG. 9B illustrates a graph 950 of the energy consumption of MTMS in comparison with the TMS, when TMS is in the worst configuration. Line 952 represents energy consumption of the MTMS when $P_r=0.1$. Line 954 represents energy consumption of the MTMS when $P_r=0.5$. Line 956 represents energy consumption of the MTMS when $P_r=0.9$. Line 958 represents energy consumption of the TMS.

FIG. 9A-FIG. 9B show that the MTMS consumes less energy compared to the TMS. This can be attributed to the fact that the multi-biometric part of the MTMS helps the system 100 to reach stability faster than using the TMS alone. The multi-biometric part of the system 100 helps quickly classify the attackers from benign users. Then the TMS part of the system 100 uses the energy-efficient biometric (in this case the fingerprint) for authentication. Thus, reducing the net energy consumption of the system 100.

Figure 10A:
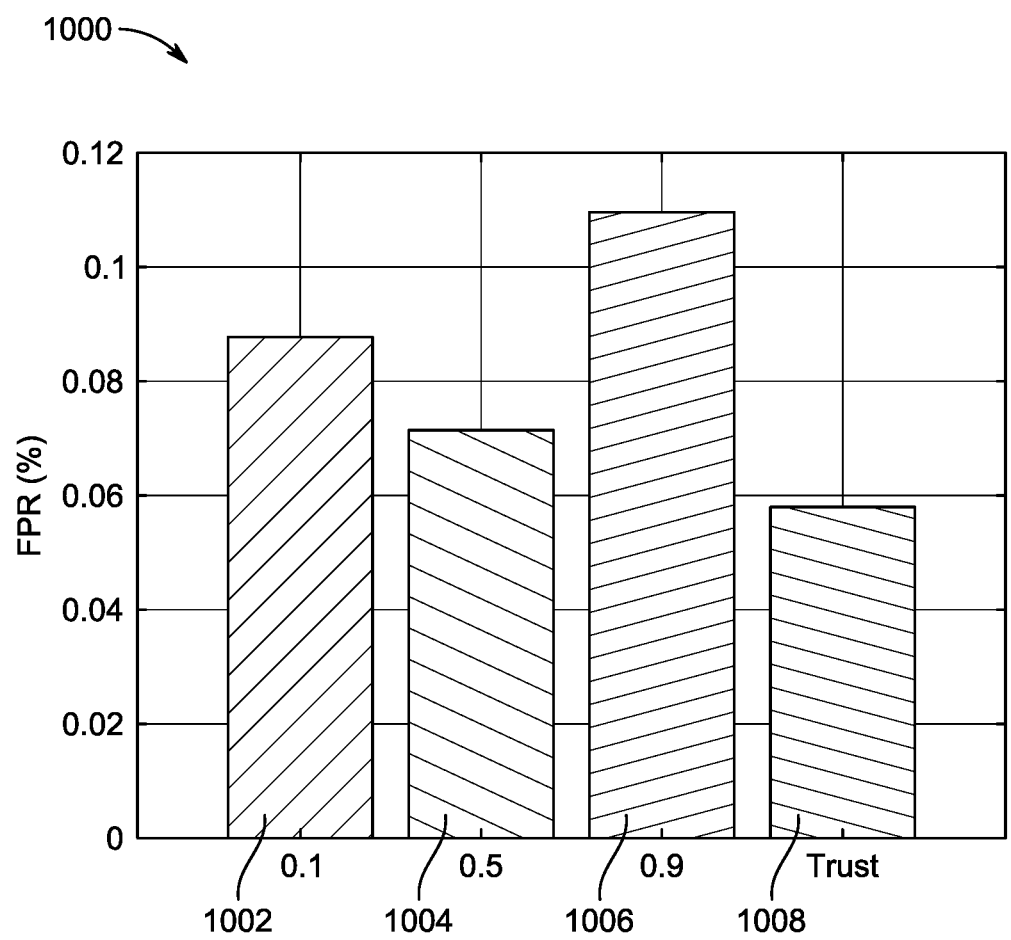
FIG. 10A illustrates a graph of the performance of the MTMS in comparison with the TMS in terms of the FPR, when the TMS is in the best configuration, according to aspects of the present disclosure.
Figure 10B:
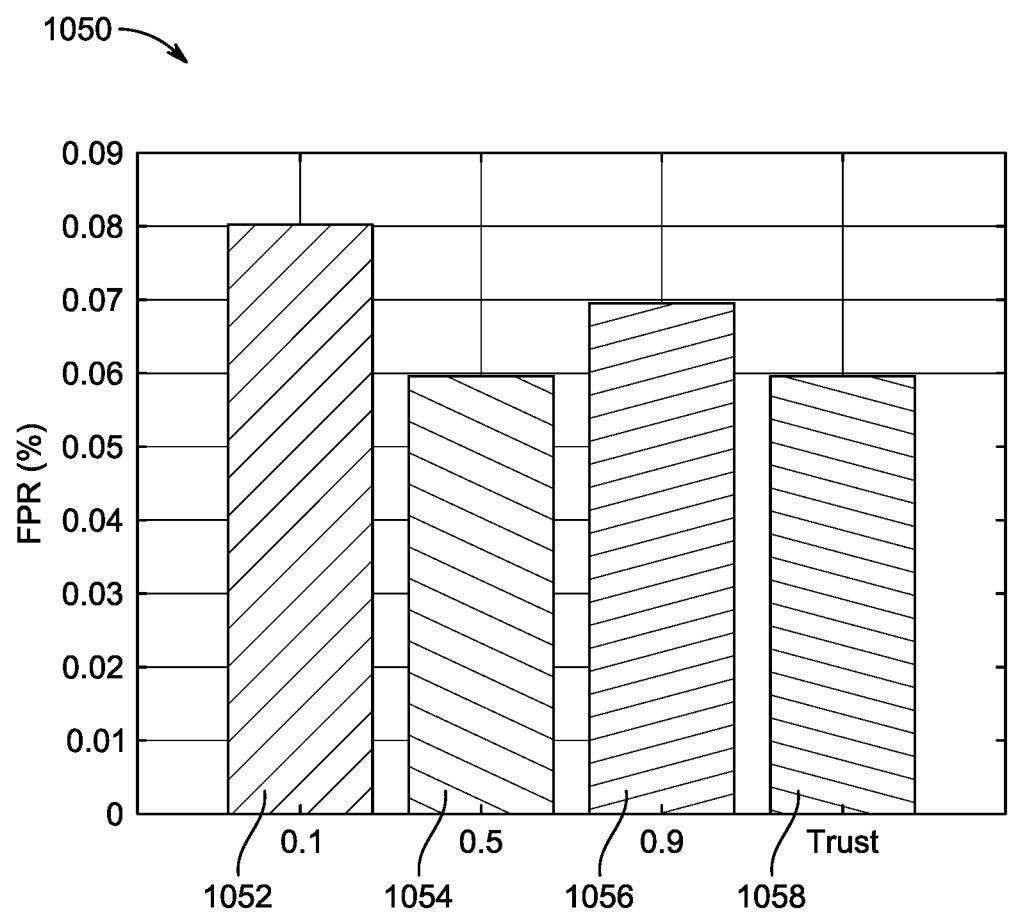
FIG. 10B illustrates a graph of the performance of the MTMS in comparison with the TMS in terms of the FPR, when the TMS is in the worst configuration.

FIG. 10A-FIG. 10B show the FPR of the MTMS as compared to the TMS. The X-axis shows the value of "$P_r$" for the MTMS and the result for the TMS labeled as "trust". The Y-axis shows the percentage of the FPR between 0 and 1. The FPR is the portion of the malicious users accepted as benign (see equation 3).

FIG. 10A illustrates a graph 1000 of the performance of MTMS in comparison with the TMS in terms of the FPR in the best configuration of the TMS. Line 1002 represents energy consumption of the MTMS when $P_r=0.1$. Line 1004 represents energy consumption of the MTMS when $P_r=0.5$. Line 1006 represents energy consumption of the MTMS when $P_r=0.9$. Line 1008 represents energy consumption of the TMS.

FIG. 10B illustrates a graph 1050 of the performance of MTMS in comparison with the TMS in terms of the FPR in the worst configuration of the TMS. Line 1052 represents energy consumption of the MTMS when $P_r=0.1$. Line 1054 represents energy consumption of the MTMS when $P_r=0.5$. Line 1056 represents energy consumption of the MTMS when $P_r=0.9$. Line 1058 represents energy consumption of the TMS.

FIG. 10A-FIG. 10B show that the MTMS performs inadequately as compared with the TMS, because the addition of the multi-biometric part of the MTMS has increased the FPR. However, the value of the FPR at most is 11%.

Next, further details of the hardware description of the computing environment of FIG. 1 according to exemplary embodiments is described with reference to FIG. 11.

Figure 11:
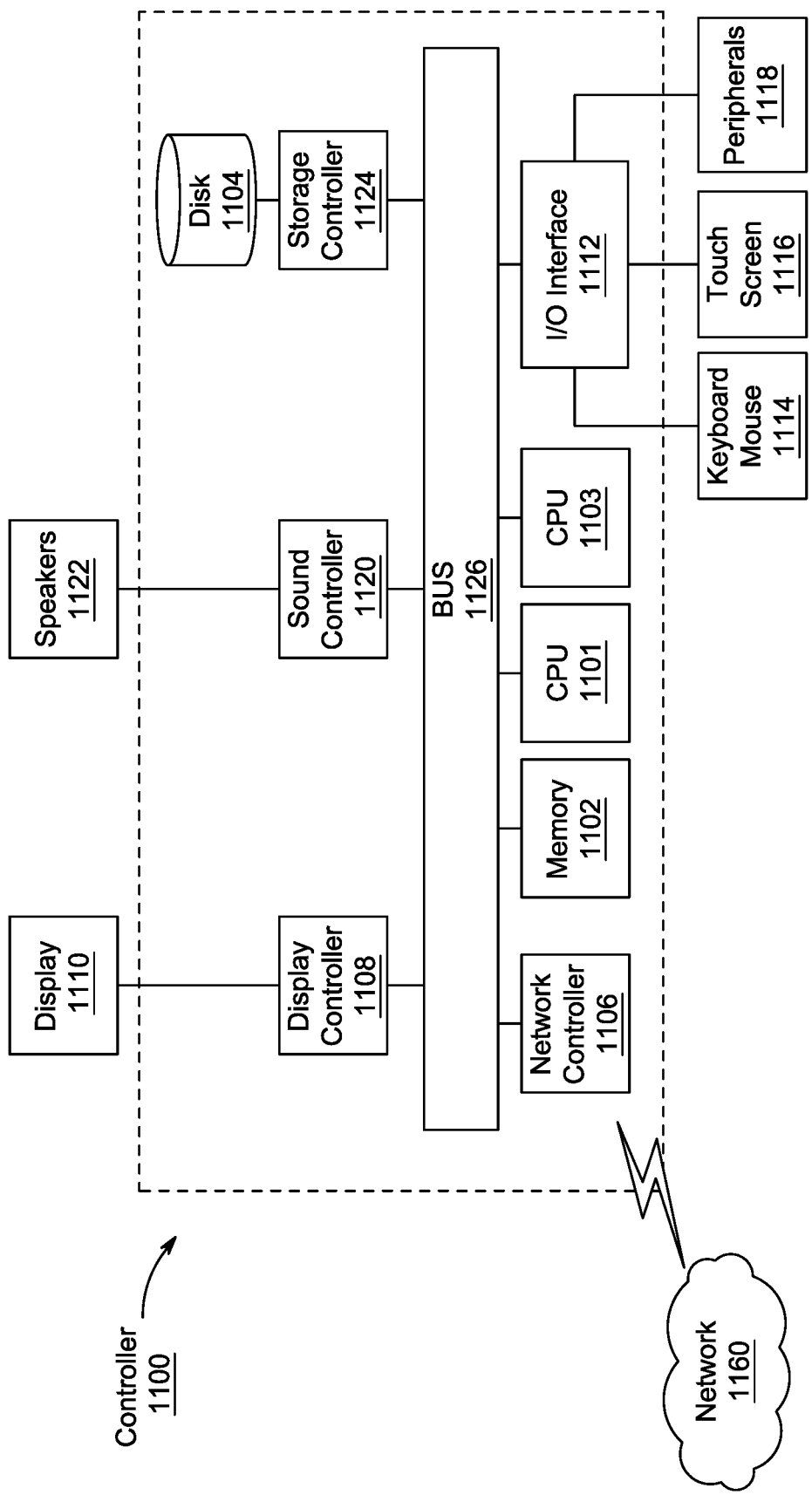
FIG. 11 is an illustration of a non-limiting example of details of computing hardware used in the computing system, according to aspects of the present disclosure.

In FIG. 11, a controller 1100 is described as representative of the system 100 having an energy-efficient multi-biometric authentication of FIG. 1 in which the processing circuitry 114 is a computing device which includes a CPU 1101 which performs the processes described above/below. FIG. 11 is an illustration of a non-limiting example of details of computing hardware used in the computing system, according to exemplary aspects of the present disclosure. In FIG. 11, a controller 1100 is described which is a computing device (that includes the processing circuitry 114) and includes a CPU 1101 which performs the processes described above/below. The process data and instructions may be stored in memory 1102. These processes and instructions may also be stored on a storage medium disk 1104 such as a hard drive (HDD) or portable storage medium or may be stored remotely.

Further, the present disclosure is not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the invention may be implemented as a utility application, background daemon, or component of an operating system, or combination thereof, executing in conjunction with CPU 1101, 1103 and an operating system such as Microsoft Windows 7, UNIX, Solaris, LINUX, Apple MAC-OS and other systems known to those skilled in the art.

The hardware elements in order to achieve the computing device may be realized by various circuitry elements, known to those skilled in the art. For example, CPU 1101 or CPU 1103 may be a Xenon or Core processor from Intel of America or an Opteron processor from AMD of America, or may be other processor types that would be recognized by one of ordinary skill in the art. Alternatively, the CPU 1101, 1103 may be implemented on an FPGA, ASIC, PLD or using discrete logic circuits, as one of the ordinary skill in the art would recognize. Further, CPU 1101, 1103 may be implemented as multiple processors cooperatively working in parallel to perform the instructions of the inventive processes described above.

The computing device in FIG. 11 also includes a network controller 1106, such as an Intel Ethernet PRO network interface card from Intel Corporation of America, for interfacing with network 1160. As can be appreciated, the network 1160 can be a public network, such as the Internet, or a private network such as an LAN or WAN network, or any combination thereof and can also include PSTN or ISDN sub-networks. The network 1160 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 1108, such as a NVIDIA GeForce GTX or Quadro graphics adaptor from NVIDIA Corporation of America for interfacing with display 1110, such as a Hewlett Packard HPL2445w LCD monitor. A general purpose I/O interface 1112 interfaces with a keyboard and/or mouse 1114 as well as a touch screen panel 1116 on or separate from display 1110. General purpose I/O interface also connects to a variety of peripherals 1118 including printers and scanners, such as an OfficeJet or DeskJet from Hewlett Packard.

A sound controller 1120 is also provided in the computing device such as Sound Blaster X-Fi Titanium from Creative, to interface with speakers/microphone 1122 thereby providing sounds and/or music.

The general-purpose storage controller 1124 connects the storage medium disk 1104 with communication bus 1126, which may be an ISA, EISA, VESA, PCI, or similar, for interconnecting all of the components of the computing device. A description of the general features and functionality of the display 1110, keyboard and/or mouse 1114, as well as the display controller 1108, storage controller 1124, network controller 1106, sound controller 1120, and general purpose I/O interface 1112 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 12.

Figure 12:
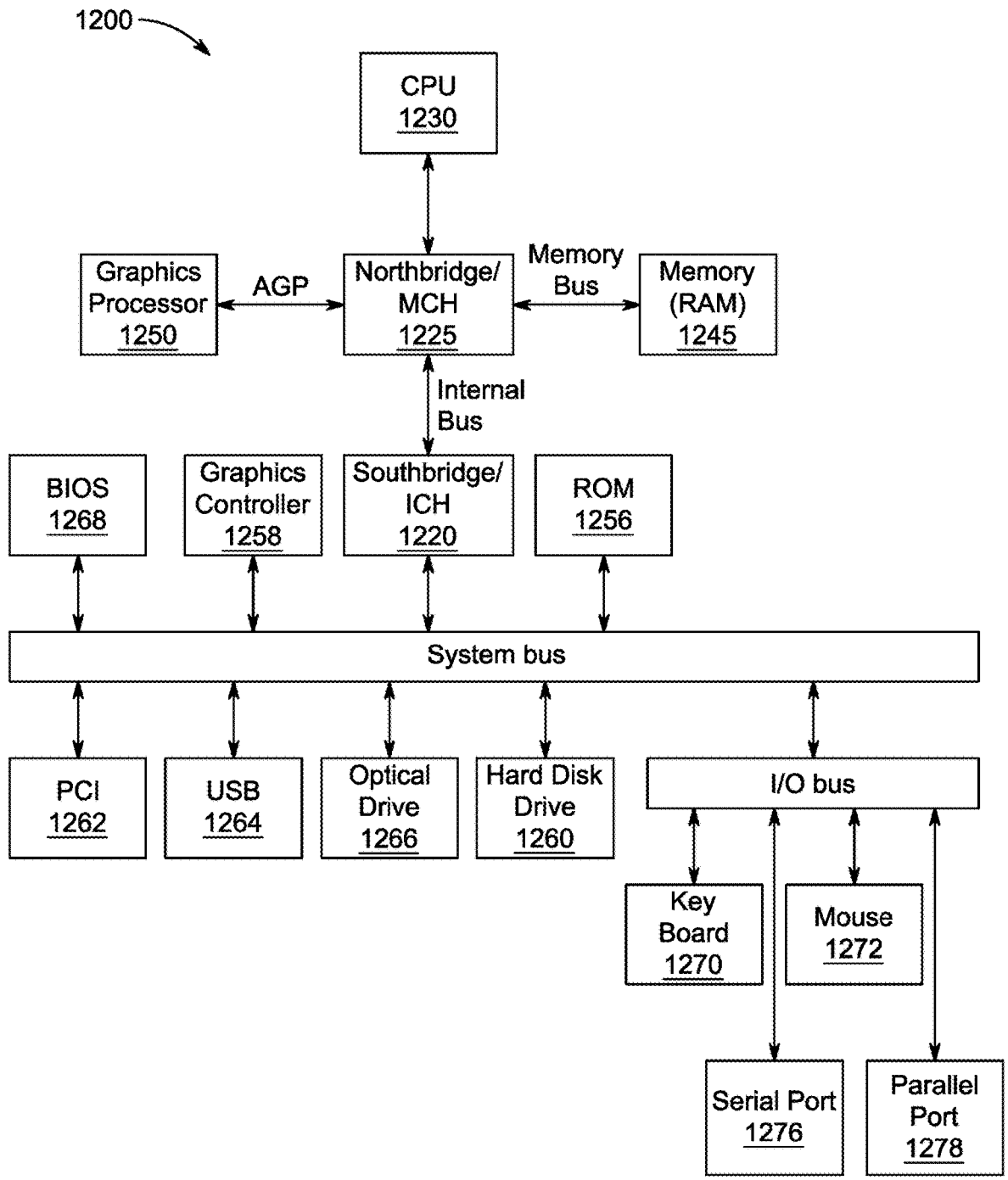
FIG. 12 is an exemplary schematic diagram of a data processing system used within the computing system, according to aspects of the present disclosure.

FIG. 12 shows a schematic diagram of a data processing system 1200 used within the computing system, according to exemplary aspects of the present disclosure. The data processing system 1200 is an example of a computer in which code or instructions implementing the processes of the illustrative aspects of the present disclosure may be located.

In FIG. 12, data processing system 1280 employs a hub architecture including a north bridge and memory controller hub (NB/MCH) 1225 and a south bridge and input/output (I/O) controller hub (SB/ICH) 1220. The central processing unit (CPU) 1230 is connected to NB/MCH 1225. The NB/MCH 1225 also connects to the memory 1245 via a memory bus, and connects to the graphics processor 1250 via an accelerated graphics port (AGP). The NB/MCH 1225 also connects to the SB/ICH 1220 via an internal bus (e.g., a unified media interface or a direct media interface). The CPU Processing unit 1230 may contain one or more processors and even may be implemented using one or more heterogeneous processor systems.

Figure 13:
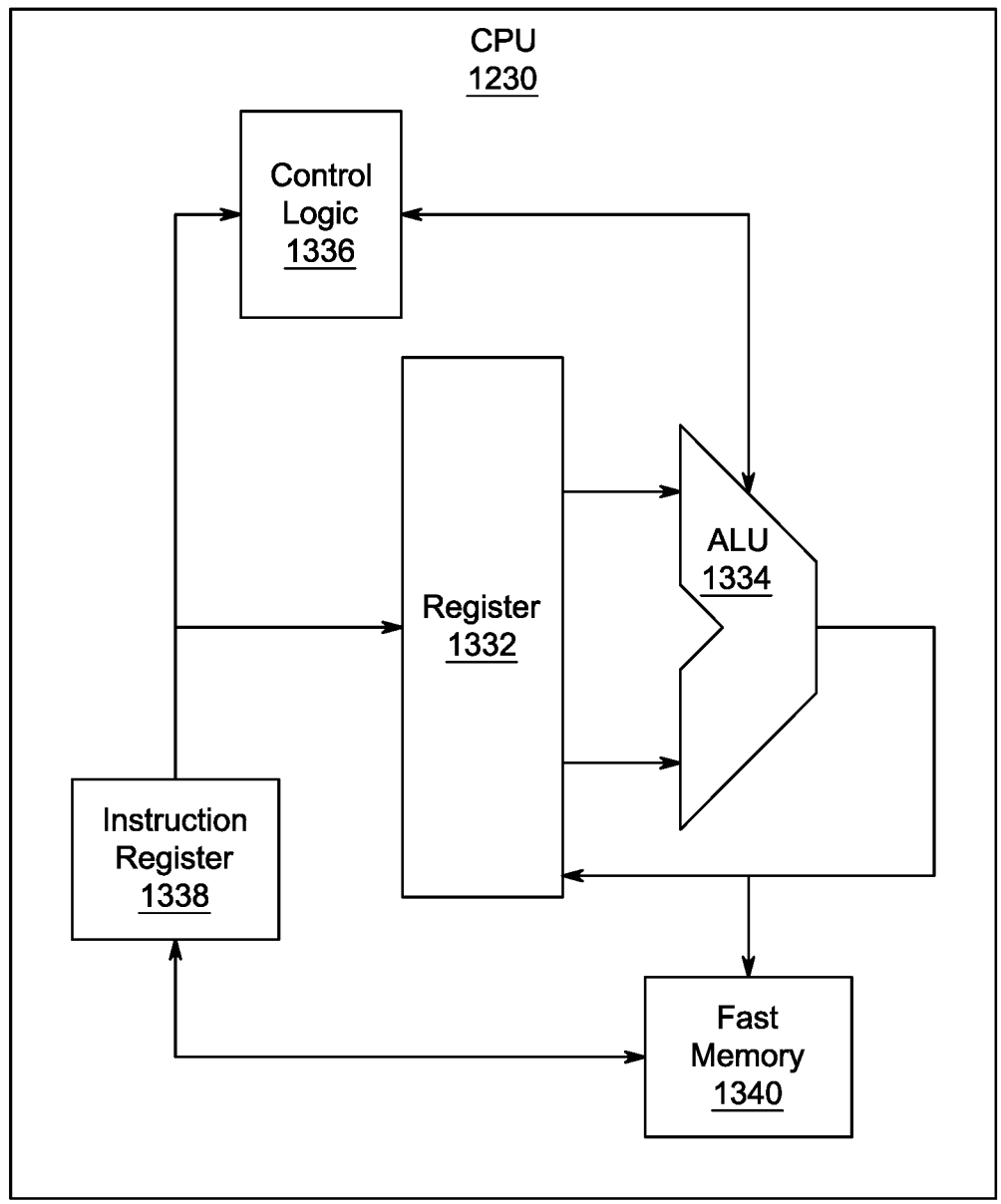
FIG. 13 is an exemplary schematic diagram of a processor used with the computing system, according to aspects of the present disclosure.

For example, FIG. 13 shows one aspect of the present disclosure of CPU 1230. In one aspect of the present disclosure, the instruction register 1338 retrieves instructions from the fast memory 1340. At least part of these instructions is fetched from the instruction register 1338 by the control logic 1336 and interpreted according to the instruction set architecture of the CPU 1230. Part of the instructions can also be directed to the register 1332. In one aspects of the present disclosure the instructions are decoded according to a hardwired method, and in another aspect of the present disclosure the instructions are decoded according to a microprogram that translates instructions into sets of CPU configuration signals that are applied sequentially over multiple clock pulses. After fetching and decoding the instructions, the instructions are executed using the arithmetic logic unit (ALU) 1334 that loads values from the register 1332 and performs logical and mathematical operations on the loaded values according to the instructions. The results from these operations can be feedback into the register and/or stored in the fast memory 1340. According to certain aspects of the present disclosures, the instruction set architecture of the CPU 1230 can use a reduced instruction set architecture, a complex instruction set architecture, a vector processor architecture, a very large instruction word architecture. Furthermore, the CPU 1230 can be based on the Von Neuman model or the Harvard model. The CPU 1230 can be a digital signal processor, an FPGA, an ASIC, a PLA, a PLD, or a CPLD. Further, the CPU 1230 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 12, the data processing system 1280 can include that the SB/ICH 1220 is coupled through a system bus to an I/O Bus, a read only memory (ROM) 1256, universal serial bus (USB) port 1264, a flash binary input/output system (BIOS) 1268, and a graphics controller 1258. PCI/PCIe devices can also be coupled to SB/ICH 1220 through a PCI bus 1262.

The PCI devices may include, for example, Ethernet adapters, add-in cards, and PC cards for notebook computers. The Hard disk drive 1260 and CD-ROM 1256 can use, for example, an integrated drive electronics (IDE) or serial advanced technology attachment (SATA) interface. In one aspect of the present disclosure the I/O bus can include a super I/O (SIO) device.

Further, the hard disk drive (HDD) 1260 and optical drive 1266 can also be coupled to the SB/ICH 1220 through a system bus. In one aspects of the present disclosure, a keyboard 1270, a mouse 1272, a parallel port 1278, and a serial port 1276 can be connected to the system bus through the I/O bus. Other peripherals and devices that can be connected to the SB/ICH 1220 using a mass storage controller such as SATA or PATA, an Ethernet port, an ISA bus, an LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 14:
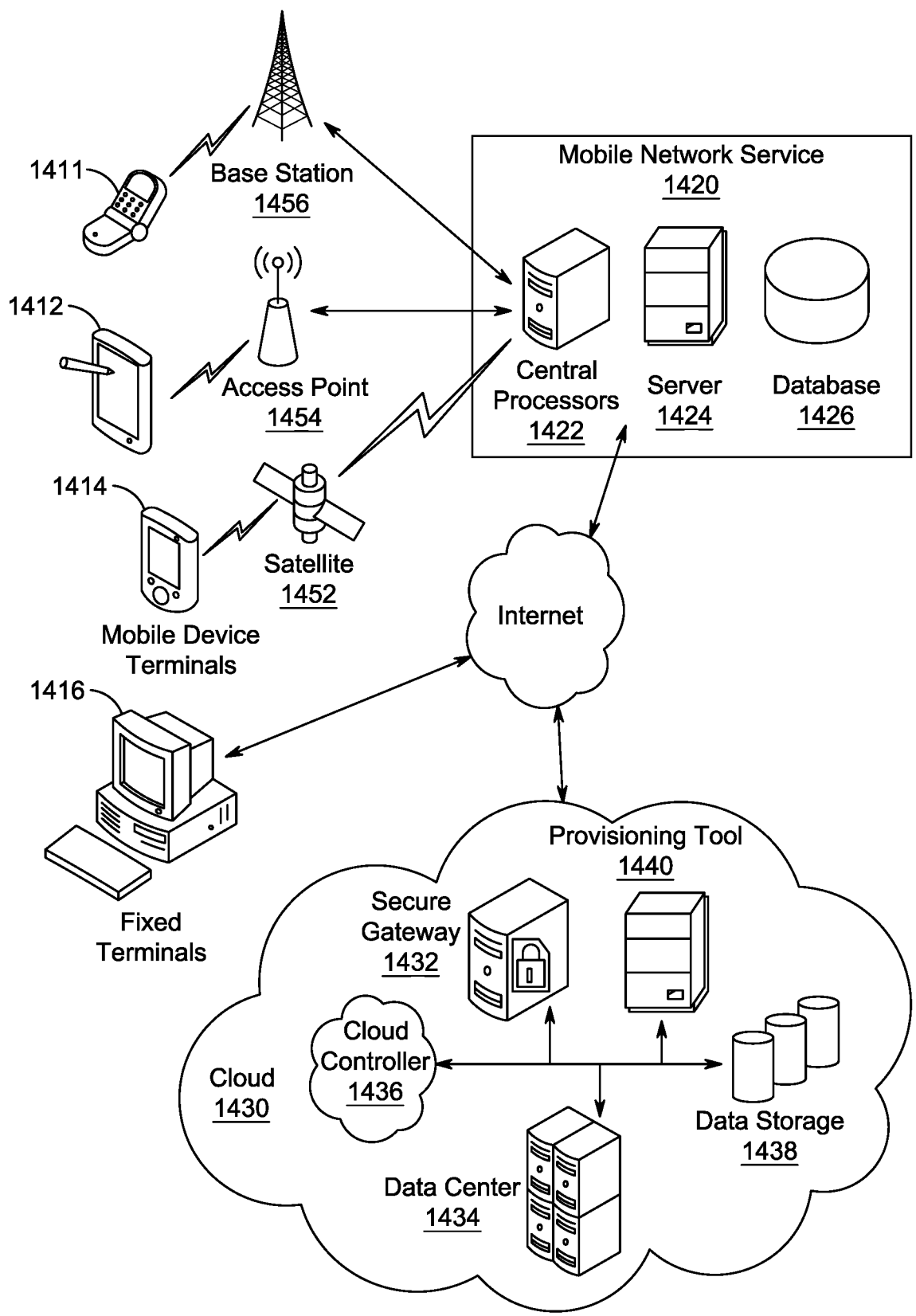
FIG. 14 is an illustration of a non-limiting example of distributed components which may share processing with the controller, according to aspects of the present disclosure.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 14, in addition to various human interface and communication devices (e.g., display monitors, smart phones, tablets, personal digital assistants (PDAs)). More specifically, FIG. 14 illustrates client devices including smart phone 1411, tablet 1412, mobile device terminal 1414 and fixed terminals 1416. These client devices may be commutatively coupled with a mobile network service 1420 via base station 1456, access point 1454, satellite 1452 or via an internet connection. Mobile network service 1420 may comprise central processors 1422, server 1424 and database 1426. Fixed terminals 1416 and mobile network service 1420 may be commutatively coupled via an internet connection to functions in cloud 1430 that may comprise security gateway 1432, data center 1434, cloud controller 1436, data storage 1438 and provisioning tool 1440. The network may be a private network, such as a LAN or WAN, or may be a public network, such as the Internet. Input to the system may be received via direct user input and received remotely either in real-time or as a batch process. Additionally, some aspects of the present disclosures may be performed on modules or hardware not identical to those described.

The above-described hardware description is a non-limiting example of corresponding structure for performing the functionality described herein.

Numerous modifications and variations of the present disclosure are possible in light of the above teachings. It is therefore to be understood that the invention may be practiced otherwise than as specifically described herein.

The invention claimed is:

1. A non-transitory computer readable storage medium storing program instructions for biometric authentication, which when executed by processing circuitry, perform a method for multi-biometric authentication in a computer system, comprising:
reading a predefined probability;
generating a random number between 0 and 1;
when the predefined probability is less than the random number,
inputting a user ID and retrieving a trust value for a user from a trust database;

when the trust value is greater than a trust threshold, then obtaining a scanned user fingerprint using a fingerprint scanner, wherein the fingerprint scanner is selected from the group consisting of an optical scanner, a capacitance scanner, an ultrasonic scanner, and a thermal scanner;

when the scanned user fingerprint equals to a stored user fingerprint in a fingerprint database, applying a reward to the trust value to increase the trust value, storing the trust value as a cumulative trust value for the user, and authenticating the user to allow access to the computer system;

otherwise applying a punishment to the trust value to decrease the trust value, and storing the trust value as the cumulative trust value for the user;

when the trust value is less than the trust threshold, then obtaining a scanned user fingerprint using a scanner and obtaining a captured user face using a camera;

when the scanned user fingerprint is substantially the same as the stored user fingerprint and the captured user face is substantially the same as a stored user face in a face database, applying a reward to the trust value to increase the trust value, storing the trust value as the cumulative trust value for the user, and allowing access to the computer system, otherwise applying a punishment to the trust value to decrease the trust value, and storing the trust value as the cumulative trust value for the user;

when the predefined probability is greater than or equal to the random number, reading face biometrics of the user using the camera;

reading fingerprint biometrics of the user using the fingerprint scanner;

inputting the user ID;

when the scanned user fingerprint is substantially the same as the stored user fingerprint and the read user face is substantially the same as a stored user face in a face database, applying a reward to the trust value to increase the trust value, storing the trust value as the cumulative trust value for the user, and authenticating the user to allow access to the computer system, otherwise applying a punishment to the trust value to reduce the trust value, and storing the trust value as the cumulative trust value for the user.

2. The computer readable storage medium of claim 1, wherein the reward is applied by adding a predetermined reward value to the trust value and the punishment is applied by subtracting a predetermined punishment value from the trust value.

3. The computer readable storage medium of claim 1, wherein the cumulative trust value is determined each time the user is authenticated by the computer system.

4. The computer readable storage medium of claim 1, wherein a user having a stored trust value below the trust threshold is an untrusted (untrustworthy) user, and a user having a stored trust value above the trust threshold is a trusted user (trustworthy).

5. The computer readable storage medium of claim 1, wherein the captured user face and the stored user face are particular features of a user face, in which if the scanned user fingerprint is substantially the same as the stored user fingerprint and the captured features of the user face is substantially the same as the stored features of the user face in a face database, applying a reward to the trust value to increase the trust value, and storing the trust value as the cumulative trust value for the user.

* * * * *